(12) United States Patent
Kray et al.

(10) Patent No.: US 12,320,273 B2
(45) Date of Patent: *Jun. 3, 2025

(54) TURBINE ENGINE WITH COMPOSITE AIRFOILS

(71) Applicant: General Electric Company, Cincinnati, OH (US)

(72) Inventors: Nicholas Joseph Kray, Mason, OH (US); Arthur William Sibbach, Boxford, MA (US)

(73) Assignee: General Electric Company, Evendale, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/792,961

(22) Filed: Aug. 2, 2024

(65) Prior Publication Data

US 2024/0392689 A1    Nov. 28, 2024

Related U.S. Application Data

(63) Continuation-in-part of application No. 18/741,419, filed on Jun. 12, 2024, which is a continuation-in-part of application No. 18/171,533, filed on Feb. 20, 2023, now Pat. No. 12,158,082.

(51) Int. Cl.
| | |
|---|---|
| *F01D 5/14* | (2006.01) |
| *F01D 5/28* | (2006.01) |
| *F01D 9/02* | (2006.01) |
| *F01D 25/00* | (2006.01) |

(52) U.S. Cl.
CPC .............. *F01D 5/282* (2013.01); *F01D 9/02* (2013.01); *F01D 25/005* (2013.01); *F05D 2220/32* (2013.01); *F05D 2240/12* (2013.01); *F05D 2240/30* (2013.01); *F05D 2300/603* (2013.01)

(58) Field of Classification Search
CPC ...................................................... F01D 5/282
See application file for complete search history.

(56) References Cited

U.S. PATENT DOCUMENTS

| | | | |
|---|---|---|---|
| 3,861,139 | A | 1/1975 | Jones |
| 4,815,940 | A | 3/1989 | LeShane et al. |
| 5,725,355 | A | 3/1998 | Crall et al. |
| 6,139,259 | A | 10/2000 | Ho et al. |
| 7,090,463 | B2 | 8/2006 | Milburn et al. |
| 7,594,325 | B2 | 9/2009 | Read |
| 8,105,042 | B2 | 1/2012 | Parkin et al. |
| 8,419,374 | B2 | 4/2013 | Huth et al. |

(Continued)

FOREIGN PATENT DOCUMENTS

| | | |
|---|---|---|
| CN | 113123834 B | 9/2021 |
| CN | 216009013 U | 3/2022 |
| FR | 3102378 A1 | 4/2021 |

*Primary Examiner* — Michael L Sehn
(74) *Attorney, Agent, or Firm* — McGarry Bair PC

(57) ABSTRACT

A turbine engine includes a fan and a turbomachine defining an engine centerline. The turbomachine includes a compressor section, a combustion section, and a turbine section in serial flow order. The turbine engine also includes a set of composite airfoils circumferentially arranged about the engine centerline. An airfoil in the set of composite airfoils including a composite portion extending chordwise between a composite leading edge and a trailing edge and a leading edge protector coupled to the composite portion.

20 Claims, 15 Drawing Sheets

(56) References Cited

U.S. PATENT DOCUMENTS

| | | | |
|---|---|---|---|
| 8,573,947 B2 | 11/2013 | Klinetob et al. | |
| 8,696,319 B2 | 4/2014 | Naik | |
| 8,814,527 B2 | 8/2014 | Huth et al. | |
| 9,045,991 B2 | 6/2015 | Read et al. | |
| 10,087,766 B2 | 10/2018 | Pope et al. | |
| 10,399,664 B2 | 9/2019 | Bowden et al. | |
| 10,408,072 B2 | 9/2019 | Bielek et al. | |
| 10,760,428 B2 | 9/2020 | Kray et al. | |
| 10,815,886 B2 | 10/2020 | Kroger et al. | |
| 10,913,133 B2 | 2/2021 | Bales et al. | |
| 11,131,314 B2 | 9/2021 | Welch | |
| 11,655,768 B2 | 5/2023 | Sibbach et al. | |
| 11,725,526 B1 | 8/2023 | Sibbach et al. | |
| 11,739,689 B2 | 8/2023 | Sibbach et al. | |
| 2016/0010468 A1 | 1/2016 | Kray et al. | |
| 2019/0234420 A1* | 8/2019 | Bryant, Jr. | B29D 99/0025 |
| 2021/0108572 A1 | 4/2021 | Khalid et al. | |
| 2021/0388726 A1 | 12/2021 | Churcher et al. | |
| 2022/0362856 A1 | 11/2022 | Suchel et al. | |
| 2023/0003133 A1 | 1/2023 | Gondre et al. | |
| 2023/0060010 A1 | 2/2023 | Sibbach et al. | |
| 2023/0258134 A1 | 8/2023 | Sibbach et al. | |

* cited by examiner

TURBINE ENGINE WITH COMPOSITE AIRFOILS

CROSS-REFERENCE TO RELATED APPLICATIONS

This application is a continuation-in-part of U.S. application Ser. No. 18/741,419, filed Jun. 12, 2024, which is a continuation-in-part of U.S. application Ser. No. 18/171,533, filed Feb. 20, 2023, now allowed, which is incorporated herein by reference in its entirety.

TECHNICAL FIELD

The disclosure generally relates to a component for a turbine engine, more specifically, to a composite airfoil.

BACKGROUND

Composite materials typically include a fiber-reinforced matrix and exhibit a high strength-to-weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
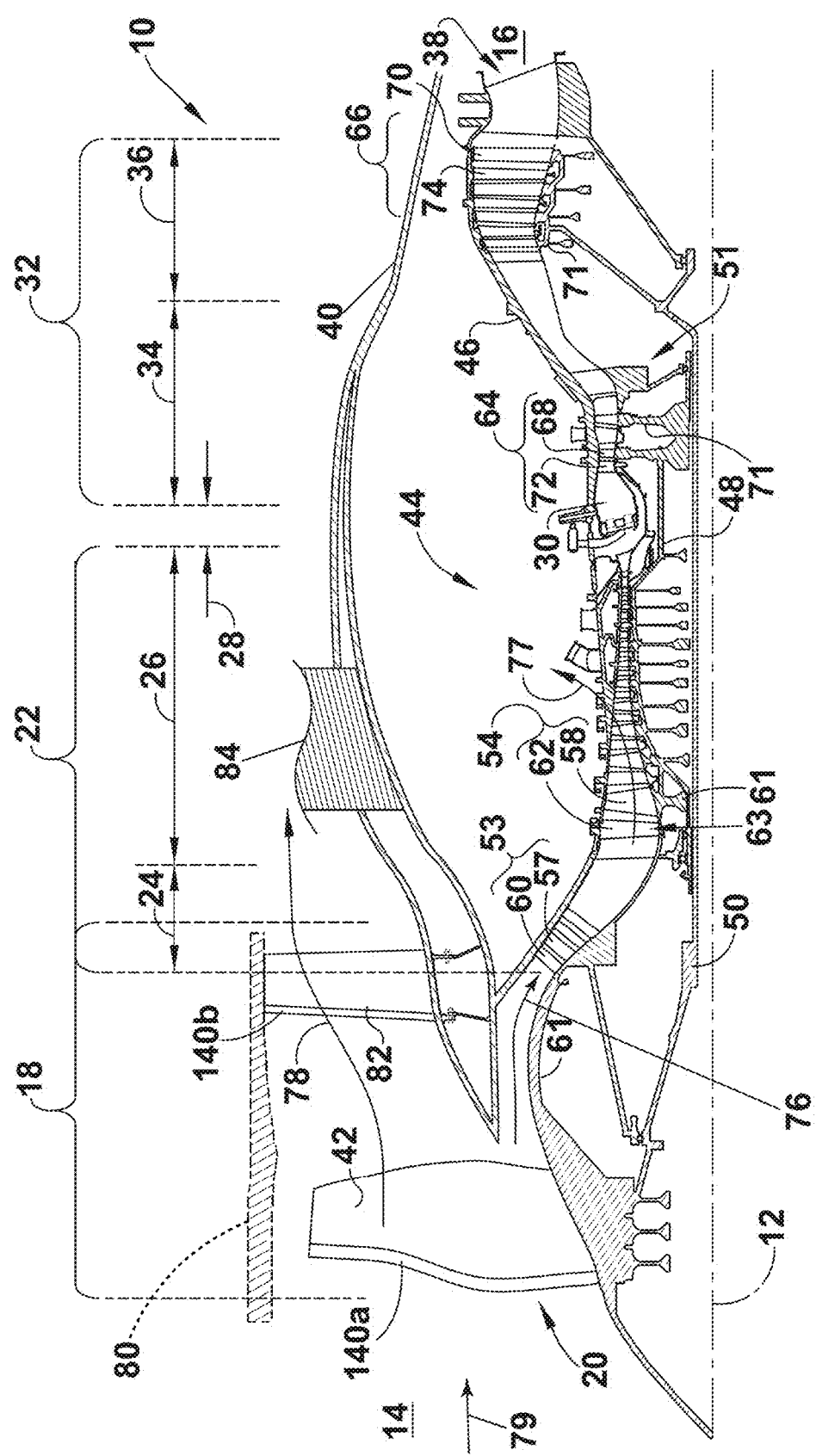
FIG. 1 is a schematic cross-sectional view of a turbine engine in accordance with an exemplary embodiment of the present disclosure.

Aspects of the disclosure herein are directed to a plurality of composite airfoil stages. For purposes of illustration, the present disclosure will be described with respect to the plurality of composite airfoil stages within an engine being a first stage of airfoils in the form of fan blades and a second stage of airfoils immediately downstream the first stage of airfoils as an outlet guide vane (OGV). While fan blades and OGVs are illustrated, it should be understood that any consecutive sets of stages are contemplated. Further, it will be understood, that aspects of the disclosure herein are not so limited and may have general applicability within an engine, including compressors, as well as in non-aircraft applications, such as other mobile applications and non-mobile industrial, commercial, and residential applications.

Reference will now be made in detail to composite fan blades and composite OGVs, one or more examples of which are illustrated in the accompanying drawings. The detailed description uses numerical and letter designations to refer to features in the drawings.

The term "composite," as used herein is, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fibers, a polymeric resin, a thermoplastic, bismaleimide (BMI), a polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components, which would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a," "an," and "the" include plural references unless the context clearly dictates otherwise. Furthermore, as used herein, the term "set" or a "set" of elements can be any number of elements, including only one.

Leading length or "LL" as used herein refers to a length between a leading edge of the airfoil and a seam between a leading edge protector and a portion of the airfoil.

First leading length or "FLL" as used herein refers to the leading length of a first stage of airfoils.

Second leading length or "SLL" as used herein refers to the leading length of a second stage of airfoils immediately downstream from the first stage of airfoils.

Chord length or "CL" as used herein refers to a length between a leading edge of the airfoil and a trailing edge of the airfoil.

First chord length or "FCL" as used herein refers to the chord length of the first stage of airfoils.

Second chord length or "SCL" as used herein refers to the chord length of the second stage of airfoils.

Airfoil protection factor or "APF" as used herein refers to a relationship in the form of a ratio of the leading length to the chord length of the airfoil. As more protection is provided for any given airfoil, the leading length increases and in turn so does the APF.

Stage performance factor or "SPF" as used herein refers to a relationship in the form of a ratio of the airfoil protection factor for the first stage of airfoils, or "APF1" to the airfoil protection factor for the second stage of airfoils, or "APF2".

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, a turbine engine defining a centerline and a circumferential direction is provided. The turbine engine may generally include a turbomachine and a rotor assembly. The rotor assembly may be driven by the turbomachine. The turbomachine, the rotor assembly, or both may define a substantially annular flow path relative to the centerline of the turbine engine. In certain aspects of the present disclosure, an unducted or open rotor turbine engine includes a set of circumferentially spaced fan blades, which extend, exteriorly, beyond a nacelle encasing or engine core.

The turbine engine includes airfoils in the form of blades and vanes. The airfoils described herein can be a plurality of airfoils provided circumferentially about the centerline or be partially provided about a portion of the centerline. At least one airfoil in the plurality of airfoils includes a protective covering on a leading edge of the airfoil. The protective covering can be a metal covering. The protective covering is referred to herein as leading edge protector.

The leading edge protector can be designed for various flight conditions, including take off, descent, and idle. The objective, when designing an airfoil, specifically a composite fan blade and a composite outlet guide vane can be generally stated as balancing an added weight component from the protective covering, or sheath, on the leading edge with an acceptable amount of protection of the leading edge. The balancing of efficient weight designs can be particularly important in large turbofan applications of traditional direct drive, gear-reduction designs, and open-rotor designs. Key factors to consider include that the ratio of the leading edge chord to the blade chord is a balance between the leading edge dominating the response to a bird ingestion or similar event, and the PMC airfoil dominating the characteristics of the blade aerodynamics in normal operation.

There is a tradeoff between the percent of the airfoil chord that is covered by the leading edge protector, and the performance of the airfoil. The protective covering provides a stiffness to the airfoil for bird ingestion, but the remainder of the blade is desirable to be flexible for aerodynamic purposes. Because the fan blade rotates and the OGV is stationary the dynamics of a bird ingestion event differs for the two airfoils.

The inventors have determined that the leading edge protector must overlap with enough of the composite airfoil in order to provide a strong enough bond, but it is desirable to minimize the overlap in order for the composite blade to flex. The leading edge protector also provides erosion protection to a composite airfoil and is required for both static and rotating airfoils. The leading edge protector characteristics have been developed from multiple tests and simulation analyses covering the ingestion of birds of varying sizes at varying span positions, and analysis of blades that have been returned for repair following bird strikes in revenue service. Furthermore, the OGV is not rotating, and experiences a different stress when impacted by a bird after it has passed through the fan. Multiple simulations and analyses depending on how the bird strikes the fan, whether it hits directly centered on a leading edge protector or hits between two adjacent blades where it is more likely to pass through without being sliced into smaller pieces. The relationship between the percent chord of a rotating and non-rotating blade that is covered by the leading edge protector is not obvious due to the difference in the forces acting upon the airfoils when struck by a bird or similar object.

The inventors' practice has proceeded in the manner of designing airfoil stages, modifying the airfoil stages with the addition of the leading edge protector, and redesigning the airfoil stages with the leading edge protector meeting protection requirements associated with the airfoil stages. After calculating and checking an amount of protection provided and an amount of weight increase or decreases associated with the leading edge protector, the process is repeated for other stages of during the design of several different types of turbomachines, such as those shown in FIG. 1. In other words, an airfoil design can meet performance requirements for one location in the engine, but not necessarily for another location.

FIG. 1 is a schematic cross-sectional diagram of a turbine engine 10 for an aircraft. By way of non-limiting example, the turbine engine 10 is illustrated as an open rotor turbine engine. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10, specifically, the fan section 18 extends radially outward from the nacelle 40. The fan section 18 includes a set of fan blades 42, and a set of outlet guide vanes (OGV) 82 downstream the set of fan blades 42, both disposed radially about the engine centerline 12. The turbine engine 10 includes any number of one or more sets of rotating blades or propellers (e.g., the set of fan blades 42) disposed upstream of a set of stationary fan vanes (e.g., the set of OGVs 82). As a non-limiting example, the turbine engine 10 can include multiple sets of rotating blades and stationary vanes. The set of fan blades 42 can include a first leading edge protector 140a and the set of OGVs 82 can include a second leading edge protector 140b. As such, the turbine engine 10 is further defined as an unducted single-fan turbine engine. The turbine engine 10 is further defined by the location of the fan section 18 with respect to the combustion section 28. The fan section 18 can be upstream, downstream, or in-line with the axial positioning of the combustion section 28. In some aspects of the disclosure herein, the turbine engine can include a fan casing 80 (shown in dotted line) surrounding the fan 20 to define a ducted turbine engine.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP spools 48 and the LP spool 50 are rotatable about the engine centerline 12 and couple to a set of rotatable elements, which collectively define a rotor 51.

It will be appreciated that the turbine engine 10 is either a direct drive or an integral drive engine utilizing a reduction gearbox coupling the LP shaft or spool 50 to the fan 20.

The LP compressor 24 and the HP compressor 26, respectively, include a set of compressor stages 53, 54, in which a set of compressor blades 57, 58 rotate relative to a corresponding set of static compressor vanes 60, 62 (also called a nozzle) to compress or pressurize the stream of fluid passing through the stage. In a single compressor stage 53, 54, multiple compressor blades 57, 58 are provided in a ring and extend radially outward relative to the engine centerline 12, from a blade platform to a blade tip, while the corresponding static compressor vanes 60, 62 are positioned upstream of and adjacent to the compressor blades 57, 58. It is noted that the number of blades, vanes, and compressor stages shown in FIG. 1 were selected for illustrative purposes only, and that other numbers are possible.

The compressor blades 57, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outward relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are mounted to the engine casing 46 in a circumferential arrangement. The compressor blades 57, 58 and the turbine blades 68, 70 described herein can be part of a blisk, rather than being mounted to a disk.

Complementary to the rotor portion, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated portion. For example, the nacelle 40 extends axially forward such that a portion of the nacelle 40 overlays or covers a portion of the fan section 18 or a booster section (not illustrated) of the turbine engine 10. A pylon 84 mounts the turbine engine 10 to an exterior structure (e.g., a fuselage of an aircraft, a wing, a tail wing, etc.).

During operation of the turbine engine 10, a freestream airflow 79 flows against a forward portion of the turbine engine 10. A portion of the freestream airflow 79 becomes an inlet airflow 78. The inlet airflow 78 flows through the set of fan blades 42 and over the nacelle 40 of the turbine engine 10. Subsequently, the inlet airflow 78 flows over at least a portion of the set of OGVs 82, which directs the inlet airflow 78 such that it is transverse toward the engine centerline 12. The inlet airflow 78 then flows past the set of OGVs 82, following the curvature of the nacelle 40 and toward the exhaust section 38.

A portion of the freestream airflow 79 enters the engine core 44 after flowing through the set of fan blades 42 and is described as a working airflow 76, which is used for combustion within the engine core 44. More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed 77 air (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
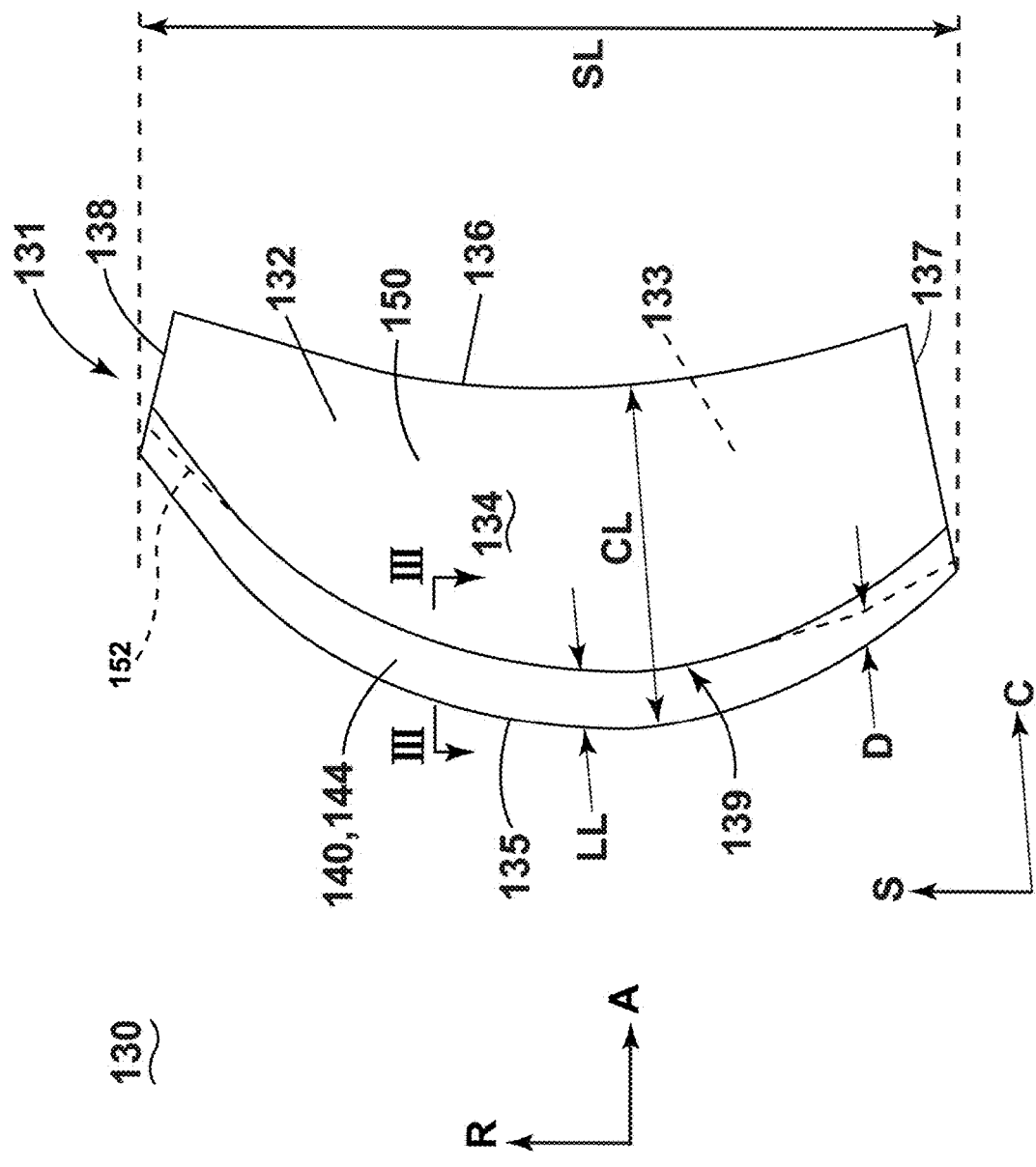
FIG. 2 is a schematic illustration of a composite airfoil in the form of a fan blade for the turbine engine of FIG. 1 according to an exemplary embodiment of the present disclosure.

FIG. 2 is schematic illustration of a composite airfoil 130 in the form of, by way of non-limiting example, a fan blade 131. The fan blade 131 can be, by way of non-limiting example, a blade of the set of fan blades 42 or a blade from the compressor blades 57, 58 or the turbine blades 68, 70. Further, the composite airfoil 130 can be a vane of the set of OGVs 82 or a vane of the static vanes 60, 62, 72, 74. It is contemplated that the composite airfoil 130 can be a blade, vane, airfoil, or other component of any turbine engine, such as, but not limited to, a gas turbine engine, a turboprop engine, a turboshaft engine, or a turbofan engine.

The composite airfoil 130 can include a wall 132 bounding an interior 133. The wall 132 can define an exterior surface 134 extending radially between a leading edge 135 and a trailing edge 136 to define a chordwise direction (denoted "C"). The composite airfoil 130 has a chord length (denoted "CL") measured along the chordwise direction C between the leading edge 135 and the trailing edge 136. The exterior surface 134 can further extend between a root 137 and a tip 138 to define a spanwise direction (denoted "S"). The composite airfoil 130 has a span length (denoted "SL") measured along the spanwise direction S between the root 137 and the tip 138 where the root is considered 0% of the span length SL and the tip 138 is considered 100% of the span length SL. The span length SL is the maximum distance between the root 137 and the tip 138 of the composite airfoil 130. It will be understood that the composite airfoil 130 can take any suitable shape, profile, or form including that the leading edge 135 need not be curved.

An axial direction (denoted "A") extends generally across the page from right to left. The axial direction A is parallel to the engine centerline 12 (FIG. 1). A radial direction (denoted "R") extends perpendicularly away from the axial direction A. It should be understood that the spanwise direction S is parallel to the radial direction R. The chordwise direction C can extend generally along the axial direction A, however with more bend in the composite airfoil 130, it should be understood that the chordwise direction C can extend both into and out of the page and across the page from left to right.

The exterior surface 134 is defined by a leading edge protector 140 and a composite portion 150. A seam 139, separates the leading edge protector 140 from the composite portion 150 along the exterior surface 134. The leading edge protector 140 extends along the chordwise direction C between the leading edge 135 and the seam 139 to define a leading length (denoted "LL").

The leading edge protector 140 is typically a metallic leading edge protector and can be made of, but is not limited to, steel, aluminum, refractory metals such as titanium, or superalloys based on nickel, cobalt, or iron. It should be understood that the leading edge protector 140 for the fan blade 131 can be a metallic leading edge protector while a set of stationary vanes downstream from the fan blade 131, by way of non-limiting example the set of OGVs 82 (FIG. 1), have the second leading edge protector 140b (FIG. 1) made of a polyurethane material. Further, the leading edge protectors 140, 140a, 140b described herein can be any suitable material such as metal, thermoplastic, or polyurethane, where both are the same, or different.

The composite portion 150 can include a composite leading edge 152 spaced a distance (denoted "D") from the leading edge 135. The composite leading edge 152 can define at least a portion of, or all of the seam 139. It is further contemplated that at least a part of the leading edge protector 140 overlaps the composite portion 150 such that at least a portion of, illustrated in dashed line, or all of the composite leading edge 152 is located upstream from the seam 139. In other words, the leading edge protector 140 can define a sheath 144 on the composite leading edge 152.

The composite portion 150 can be made of one or more layers of material. The one or more layers of material can be applied during the same stage or different stages of the manufacturing of the composite airfoil 130. By way of non-limiting example, composite portion 150 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The leading edge protector 140 and the composite portion 150 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

It will be shown herein that a relationship between the leading length LL and the chord length CL can be referred to herein as an airfoil protection factor or simply as "APF." In other words, for any given composite airfoil 130 having a predetermined chord length CL, an amount of coverage provided by the leading edge protector 140 increases, so does the leading length LL and in turn the APF.

Figure 3:
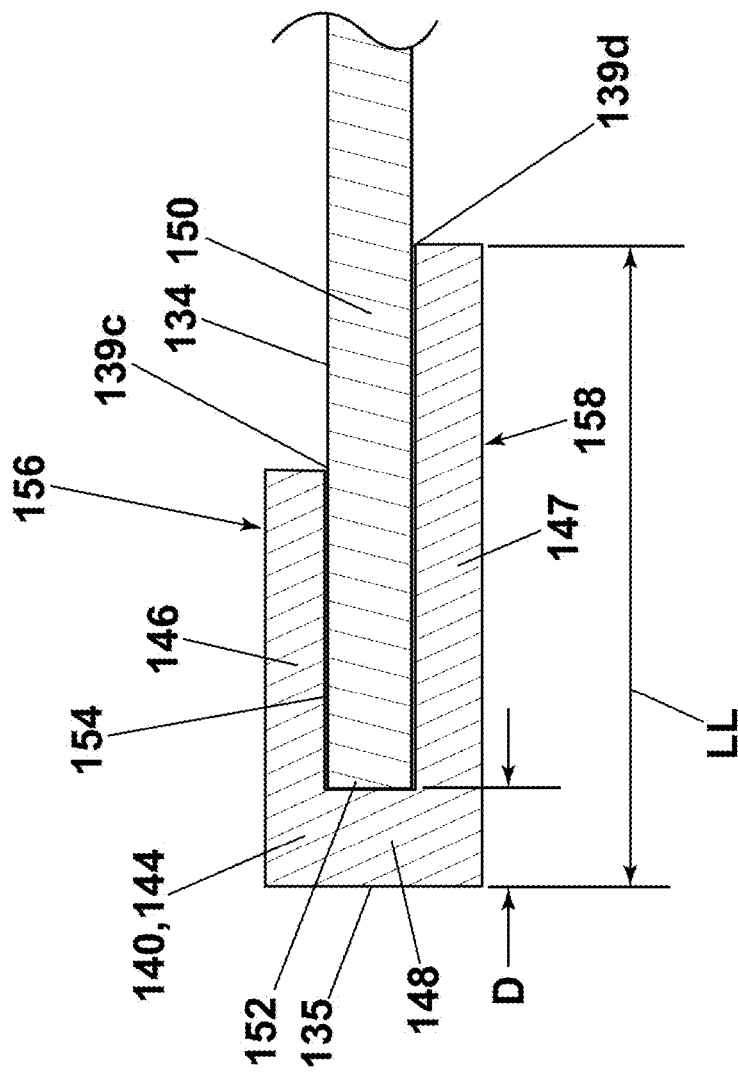
FIG. 3 is a schematic cross-section taken along line III-III of FIG. 2.

FIG. 3 is a schematic cross-section taken along line III-III of FIG. 2. The leading edge protector 140 is the sheath 144 with a first wall 146, a second wall 147, and a third wall 148 interconnecting the first wall 146 and the second wall 147. The first wall 146, second wall 147, and third wall 148 of the leading edge protector 140 are oriented and shaped such that they define a generally U-shaped (or C-shaped) channel 154 therebetween. As shown in FIG. 3 and as will be discussed below, the channel 154 is sized and shaped to receive the composite leading edge 152 of the composite portion 150. Notably, the shape of the channel 154 is shown by way of example only and the channel 154 is not limited to this specific shape and is not drawn to scale.

The composite airfoil 130 can extend between a first side 156 and a second side 158. The seam 139 can be two seams 139c, 139d at corresponding ends of the channel 154. The leading length LL is measured from the leading edge 135 to the seam 139d furthest from the leading edge 135. While illustrated at two different locations, it should be understood that the seams 139c, 139d can be located at the same leading length LL. While illustrated as rectangular blunt ends at the seam 139, the leading edge protector 140 can taper such that the leading edge protector 140 and the composite portion 150 are flush to define the exterior surface 134.

Figure 4:
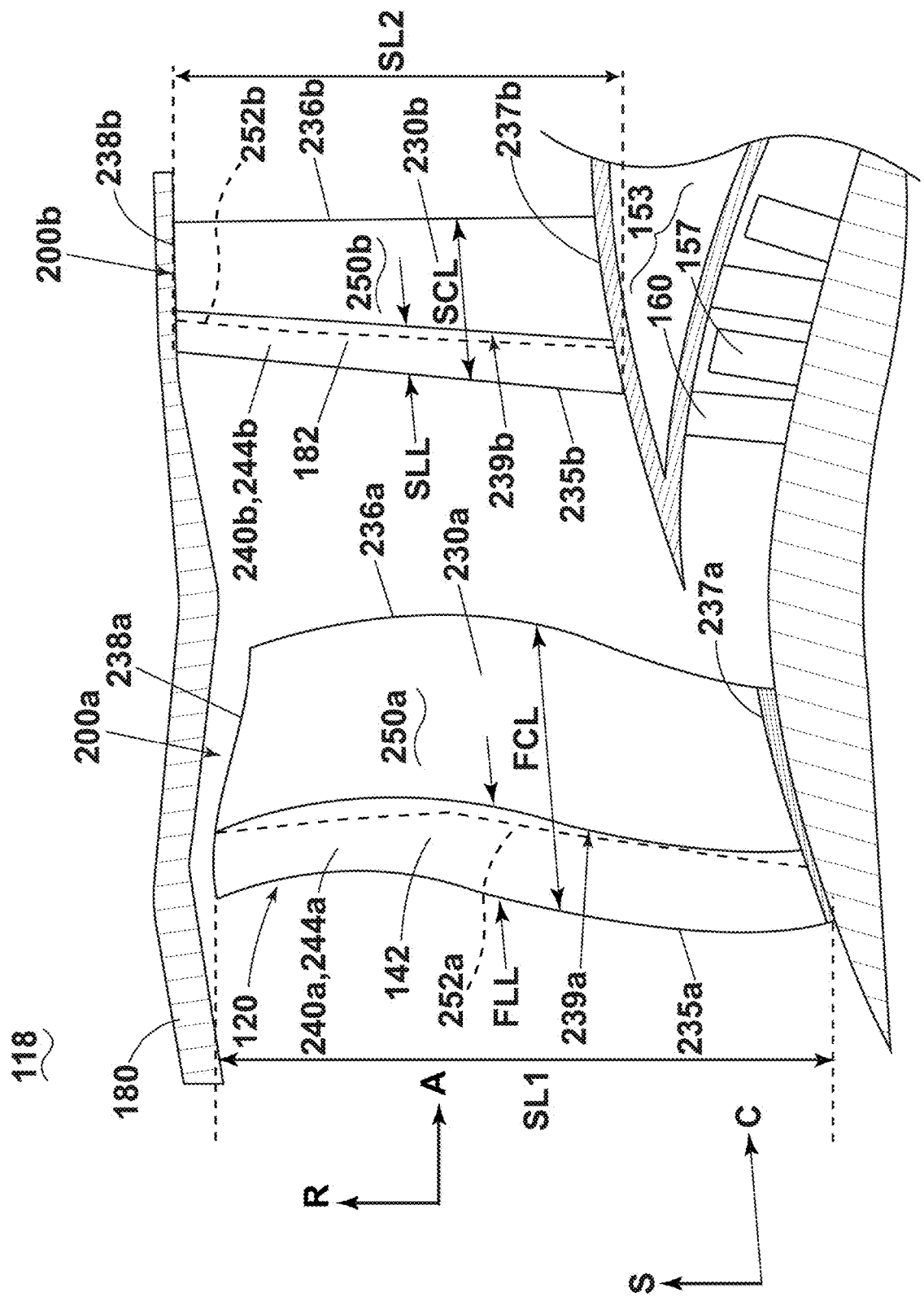
FIG. 4 is a schematic enlarged view of an exemplary fan section for the turbine engine of FIG. 1 according to an exemplary embodiment of the present disclosure.

FIG. 4 is schematic enlarged view of a fan section 118 similar to fan section 18 therefore, like parts of the fan section 118 (FIG. 1) will be identified with like numerals increased by 100, with it being understood that the description of the like parts of the fan section 18 applies to the fan section 118, except where noted.

A set of compressor stages 153 include a set of compressor blades 157 rotating relative to a corresponding set of static compressor vanes 160. A set of fan blades 142 define a fan section 118 including a fan 120. The turbine engine can include a fan casing 180 surrounding the fan 120.

The set of fan blades 142 defines a first stage of airfoils 200a within the fan section 118 (FIG. 1). A first airfoil 230a in the first stage of airfoils 200a is similar to the previously described airfoil 130, therefore like parts of the first airfoil 230a will be identified with like numerals increased by 100 and having a notation "a" with it being understood that the description of the like parts of the airfoil 130 applies to the first airfoil 230a, except where noted. While only a single fan blade is shown in the cross-section it will be understood that that the set of fan blades 142 are included and spaced about the fan section 118.

The first airfoil 230a has a first span length (denoted "SL1") measured along the spanwise direction S between a first root 237a and a first tip 238a where the first root 237a is considered 0% of the first span length SL1 and the first tip 238a is considered 100% of the first span length SL1. The first span length SL1 is the maximum distance between the first root 237a and the first tip 238a of the first airfoil 230a.

A first leading edge protector 240a extends along the chordwise direction C between a first leading edge 235a and a first seam 239a to define a first leading length (denoted "FLL"). The first airfoil 230a has a first chord length (denoted "FCL") measured along the chordwise direction C between the first leading edge 235a and the first trailing edge 236a.

A relationship between the first leading length (FLL) and the first chord length (FCL) is denoted herein with a first expression of the APF:

$$APF1 = \frac{FLL}{FCL} \quad (1)$$

OGVs 182 define a second stage of airfoils 200b downstream from the first stage of airfoils 200a. A second airfoil 230b in the second stage of airfoils 200b is similar to the previously described airfoil 130, therefore like parts of the second airfoil 230b will be identified with like numerals increased by 100 and having a notation "b" with it being understood that the description of the like parts of the airfoil 130 applies to the second airfoil 230b, except where noted. The second airfoil 230b is located downstream from the first airfoil 230a. While only a single outlet guide vane 182 is shown in the cross-section it will be understood that the OGVs 182 are multiple OGVs spaced about the fan section 118.

A second leading edge protector 240b extends along the chordwise direction C between a second leading edge 235b and a second seam 239b to define a second leading length (denoted "SLL"). The second airfoil 230b has a second chord length (denoted "SCL") measured along the chordwise direction C between the second leading edge 235b and second trailing edge 236b.

The second airfoil 230b has a second span length (denoted "SL2") measured along the spanwise direction S between a second root 237b and a second tip 238b where the second root 237b is considered 0% of the second span length SL2 and the second tip 238b is considered 100% of the second span length SL2. The second span length SL2 is the maximum distance between the second root 237b and the second tip 238b of the second airfoil 230b.

The first and second leading edge protectors 240a, 240b can each define first and second sheaths 244a, 244b. An exterior surface of each airfoil 230a, 230b is defined by the corresponding leading edge protectors 240a, 240b and a corresponding composite portion 250a, 250b. The composite portions 250a, 250b can each include a corresponding composite leading edge 252a, 252b which can define at least a portion of, or all of the corresponding seams 239a, 239b.

A relationship between the second leading length (SLL) and the second chord length (SCL) is denoted herein with a second expression of the APF:

$$APF2 = \frac{SLL}{SCL} \quad (2)$$

As will be further discussed herein, the APF describes an amount of protection coverage by the leading edge protector of any of the airfoils 130, 230a, 230b described herein. A balance trade-off between the amount of protection and the weight gain/loss associated with any of the protector portions described herein can be expressed by an APF value of from 0.1 to 0.3, inclusive of endpoints. In other words, to satisfy protection requirements the leading edge protector described herein should protect at least 10% and up to and including 30% of the composite airfoil before becoming too heavy.

The first stage of airfoils 200a has a first number of airfoils and the second stage of composite airfoils 200b has a second number of airfoils different than the second number. In other words, the consecutive stages of airfoils can vary in size and number of airfoils. Further, the first stage of composite airfoils 200a and the second stage of composite airfoils 200b can both be configured to rotate.

It will be appreciated that the number, size, and configuration of the composite airfoils described herein are provided by way of example only and that in other exemplary embodiments, the composite airfoils may have any other suitable configuration including that the plurality of airfoils may be in multiple rotor stages, etc.

As described earlier, finding a workable solution that balances the amount of protective covering for the composite airfoil as described herein whilst maintaining a weight requirement is a labor-intensive and time-intensive process, because the process is iterative and involves the selection of multiple composite airfoils with various protector edge lengths and chord lengths. Design procedures require placing said composite airfoil 130 (FIG. 2) into a turbine engine designed for a first flight operating condition and embodying a protection effectiveness with acceptable weight gain/losses for that first flight operating condition. Evaluating whether in a second, third, or other flight operating condition, the same selected composite airfoil 130 maintains a heat effectiveness with acceptable protection effectiveness for the other operating conditions is time-intensive and necessitates re-design of the composite airfoil and even the turbine engine in the event the conditions are not met. It is desirable to have an ability to arrive at an optimal composite airfoil, like the composite airfoil(s) described herein, rather than relying on chance. It would be desirable to have a limited or narrowed range of possible composite airfoil configurations for satisfying mission requirements, such requirements including protection, weight restrictions, heat transfer, pressure ratio, and noise transmission level requirements, as well as the ability to survive bird strikes at the time a composite airfoil 130 is selected and located within an engine.

The inventor(s) sought to find the trade-off balance between leading edge protection and weight gain/loss while satisfying all design requirements, because this would yield a more desired composite airfoil suited for specific needs of the engine, as described above. Knowing these trade-offs is also a desirable time saver.

TABLE 1 below illustrates some composite airfoil configurations that yielded workable solutions to the trade-off balance problem.

TABLE 1

| Example: | 1 | 2 | 3 | 4 | 5 | 6 |
|---|---|---|---|---|---|---|
| CL (cm) | 47 | 11 | 29 | 60 | 9.7 | 13 |
| LL (cm) | 11 | 1.7 | 3.2 | 16 | 1.5 | 2.3 |
| SL (%) | 20 | 20 | 38 | 50 | 50 | 80 |

It was discovered, unexpectedly, during the course of engine design and the time-consuming iterative process previously described, that a relationship exists between the ratio of the leading length LL to the chord length CL. It has been found that the optimal amount of protective covering of the composite airfoil lies within a specific range based on the leading length LL of the protective covering and the chord length CL of the composite airfoil.

TABLE 2 below illustrates some consecutive composite airfoil stages with workable solutions to the trade-off balance problem. Different span percentages are shown in TABLE 2. It was found that the CL and LL should be taken for any position between 20% and 80%, inclusive of end points of the span length SL. The specific range of the span length was chosen because the airfoil may have different properties, profiles, etc. at its distal ends. In the non-limiting examples, the fan blade dimensions determine APF1 while the outlet guide vane dimensions determine APF2.

TABLE 2

| Fan Blade | | | Outlet Guide Vane | | |
|---|---|---|---|---|---|
| Span (%) | CL (cm) | LL (cm) | Span (%) | CL (cm) | LL (cm) |
| 20 | 46.9 | 11.2 | 20 | 31.4 | 3.18 |
| 24 | 48.3 | 11.6 | 26 | 30.6 | 3.18 |
| 28 | 50.5 | 13.6 | 32 | 30.0 | 3.18 |
| 32 | 52.4 | 14.2 | 38 | 29.3 | 3.18 |
| 36 | 54.5 | 14.6 | 44 | 28.7 | 3.18 |
| 40 | 56.5 | 15.0 | 50 | 28.1 | 3.18 |
| 44 | 58.2 | 15.3 | 56 | 27.5 | 3.18 |
| 48 | 59.4 | 15.5 | 62 | 26.9 | 3.18 |
| 52 | 60.1 | 15.7 | 68 | 26.6 | 3.18 |
| 56 | 60.6 | 15.6 | 74 | 26.7 | 3.18 |
| 60 | 61.0 | 15.7 | 80 | 27.4 | 3.18 |
| 64 | 61.5 | 15.5 | | | |
| 68 | 61.9 | 15.4 | | | |
| 72 | 65.0 | 15.4 | | | |
| 76 | 63.2 | 15.5 | | | |
| 80 | 64.4 | 15.7 | | | |

Moreover, utilizing this relationship, the inventor found that the number of suitable or feasible composite airfoil possibilities for placement in a turbine engine that are capable of meeting the design requirements could be greatly reduced, thereby facilitating a more rapid down-selection of composite airfoils to consider as an engine is being developed. Such benefit provides more insight to the requirements for a given engine, and to the requirements for particular composite airfoil locations within the engine, long before specific technologies, integration, or system requirements are developed fully. The discovered relationship also avoids or prevents late-stage redesign while also providing the composite airfoil with a required protection effectiveness within given weight parameters.

More specifically, the inventors found that a relationship between the first expression of the APF, APF1, and the second expression of the APF, APF2, optimizes the protection amount for successive stages of airfoils. This relationship was an unexpected discovery during the course of engine design—i.e., designing multistage airfoil sections such as by way of non-limiting examples fan sections, fan blades, and outlet guide vanes and evaluating the impact that an amount of protection on the fan blade has on a needed amount of protection on the outlet guide vane, or vice versa. Narrowing the options down based on surrounding stages of airfoils can significantly decrease both material and time costs.

In other words, an amount of protection provided by the first leading edge protector 240a on the first airfoil 230a can affect an amount of protection necessary for the second airfoil 230b downstream of the first airfoil 230a. This relationship between the multistage airfoils or successive airfoils, such as 230a and 230b, can be described by a stage performance factor (denoted "SPF") determined from a relationship between the APF1 and the APF2. The stage performance factor can generally be represented by a ratio of the first airfoil protection factor APF1 to the second airfoil protection factor APF2 represented by:

$$SPF = \frac{APF1}{APF2} \quad (3)$$

More specifically, it was found that for any position between 20% and 80%, inclusive of end points of the span length SL, a desired SPF value is greater than or equal to 0.70 and less than or equal to 4 ($0.7 \leq SPF \leq 4$). The specific range of the span length was chosen because the airfoil may have different properties, profiles, etc. at its distal ends. Conversely, at any position between 20% and 80%, inclusive of end points the airfoil is more uniform and therefore the determined ratios are applicable. It will be understood that because of its position and movement, the rotating fan blade will likely require more coverage from the leading edge protector as compared to a static airfoil or OGV, which is driving the relationship ratio to the 0.7 to 4.0 range. This is due to the fact that the rotating blade has a higher kinetic energy from impact and is driven by the rotating velocity of the airfoil.

Utilizing this relationship, the inventors were able to arrive at a better performing airfoil in terms of protection amount with acceptable weight increase. The inventors found that the SPF for a set first set of airfoils and a second set of airfoils downstream from the first set of airfoils could be narrowed to an SPF range of greater than or equal to 0.95 and less than or equal to 2.5 ($0.95 \leq SPF \leq 2.5$). Narrowing the SPF range provides more insight to the requirements for a given engine well before specific technologies, integration and system requirements are developed fully. For example, as the fan speed is reduced, coverage on the first leading edge 235a by the first leading edge protector can decrease such that the APF1 also decreases. Further, knowing a range for the SPF can prevent or minimize late-stage redesign, decrease material cost, and save time.

The SPF value represents how an amount of protection on a first stage of airfoils, like the first stage of airfoils 200a, impacts an amount of protection necessary for any downstream airfoil stages with respect to the first set of airfoil stages.

In one example, the set of fan blades 142 illustrated in FIG. 4 can have dimensions of the Fan Blade at 20% from TABLE 2 and the set of outlet guide vanes 182 can have dimensions of the Outlet Guide Vane at 20% from TABLE 2. This results in an APF1 value of (11.2/46.9) or 0.24 and an APF2 value of (3.18/31.4) or 0.10. Using the SPF ratio, an SPF value of (0.24/0.10) or 2.40 is found.

In another example, the set of fan blades 142 illustrated in FIG. 4 can have dimensions of the Fan Blade at 68% from TABLE 2 and the set of outlet guide vanes 182 can have dimensions of the Outlet Guide Vane at 68% from TABLE 2. This results in an APF1 value of (15.4/61.9) or 0.25 and an APF2 value of (3.18/26.6) or 0.12. Using the SPF ratio, an SPF value of (0.25/0.12) or 2.1 is found.

Some lower and upper bound values for each design parameter for determining Expression (3) are provided below in TABLE 3:

TABLE 3

| Parameter | Lower Bound | | Upper Bound | |
|---|---|---|---|---|
| SL (%) | 20 | 80 | 20 | 80 |
| First Airfoil | | | | |
| FCL (cm) | 24 | 32 | 56 | 77 |
| FLL (cm) | 6 | 8 | 13 | 19 |
| Second Airfoil | | | | |
| SCL (cm) | 9.9 | 9.3 | 31 | 27 |
| SLL (cm) | 1.6 | 1.5 | 4 | 3.5 |

It was found that first and second airfoil pairs with dimensions fitting in the ranges set out in TABLE 4 below fit into the composite airfoil dimensions previously described herein. These ranges enable a minimum weight gain for a compact and proficiently protected composite airfoils in succession.

TABLE 4

| Ratio | Narrow Range | Broad Range |
|---|---|---|
| SPF | 0.95-2.5 | 0.70-4.0 |
| APF1 | 0.22-0.25 | 0.20-0.30 |
| APF2 | 0.10-0.12 | 0.08-0.17 |

Pairs of first and second airfoils, with the second airfoils downstream of the first airfoils within the ranges provided can be assembled to conform with any fan section, or other downstream stage relationship for blades/vanes and blades/blades. This can include any number of engine designs including ducted and unducted engines as well as a direct-drive configuration and an indirect-drive configuration such as a speed reduction device or a geared-drive configuration.

Figure 5:
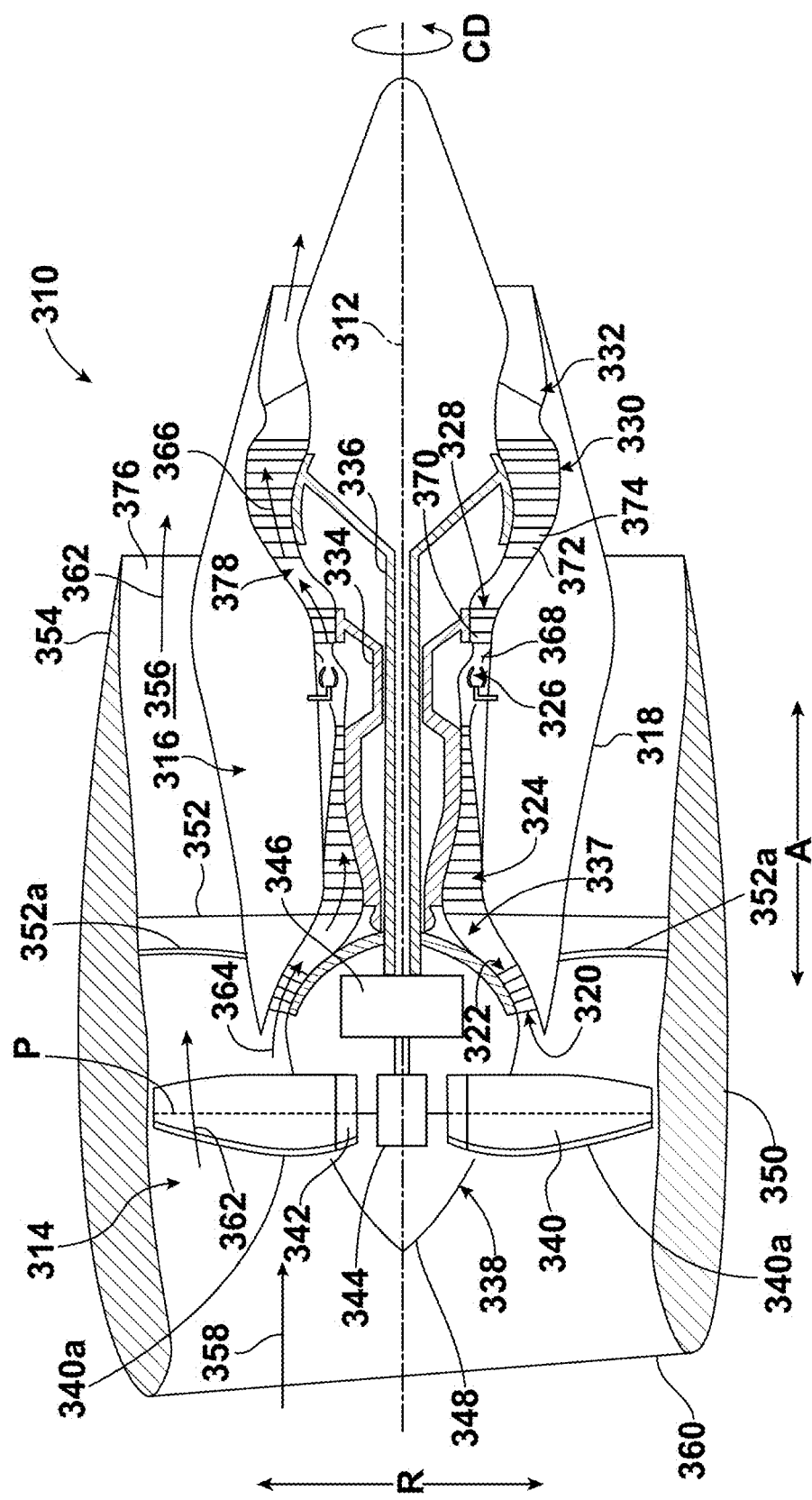
FIG. 5 is a schematic cross-sectional view of a gas turbine engine in accordance with another exemplary embodiment of the present disclosure.

For example, FIG. 5 illustrates a gas turbine engine 310 as a high-bypass turbofan jet engine, sometimes also referred to as a turbofan engine, which can include the set of composite airfoils or first and second stages of composite airfoils as described herein. The gas turbine engine 310 defines an axial direction A (extending parallel to a longitudinal centerline 312 provided for reference), a radial direction R, and a circumferential direction CD extending about the longitudinal centerline 312. In general, the gas turbine engine 310 includes a fan section 314 and a turbomachine 316 disposed downstream from the fan section 314.

The exemplary turbomachine 316 depicted generally includes a substantially tubular outer casing 318 that defines an annular inlet 320. The outer casing 318 encases, in serial flow relationship, a compressor section including a booster or low pressure (LP) compressor 322 and a high pressure (HP) compressor 324, a combustion section 326, a turbine section including a high pressure (HP) turbine 328 and a low pressure (LP) turbine 330, and a jet exhaust nozzle section 332. A high pressure (HP) shaft 334, which may additionally or alternatively be a spool, drivingly connects the HP turbine 328 to the HP compressor 324. A low pressure (LP) shaft 336, which may additionally or alternatively be a spool, drivingly connects the LP turbine 330 to the LP compressor 322. The compressor section, combustion section 326, turbine section, and jet exhaust nozzle section 332 together define a working gas flow path 337.

In the illustrated example, and by way of non-limiting example, the fan section 314 includes a fan 338 having a plurality of fan blades 340 coupled to a disk 342 in a spaced apart manner. As depicted, the fan blades 340 extend outwardly from disk 342 generally along the radial direction R. Each fan blade 340 is rotatable relative to the disk 342 about a pitch axis P by virtue of the fan blades 340 being operatively coupled to a suitable pitch change mechanism 344 configured to collectively vary the pitch of the fan blades 340, e.g., in unison. The gas turbine engine 310 further includes a speed reduction device in the form of a power gearbox 346, and the fan blades 340, disk 342, and pitch change mechanism 344 are together rotatable about the longitudinal centerline 312 by LP shaft 336 across the power gearbox 346. The power gearbox 346 includes a plurality of gears for adjusting a rotational speed of the fan 338 relative to a rotational speed of the LP shaft 336, such that the fan 338 may rotate at a more efficient fan speed. It will be understood that any suitable speed reduction device configured to adjust the rotation of the fan 338 relative to the LP shaft 336 can be utilized and that a power gearbox is merely one example thereof.

The disk 342 is covered by rotatable front hub 348 of the fan section 314. The front hub 348 is also sometimes referred to as a spinner. The front hub 348 is aerodynamically contoured to promote an airflow through the plurality of fan blades 340.

Additionally, the exemplary fan section 314 includes an annular fan casing or outer nacelle 350 that circumferentially surrounds the fan 338, circumferentially surrounds at least a portion of the turbomachine 316, or a combination thereof. It should be appreciated that the nacelle 350 is supported relative to the turbomachine 316 by a plurality of outlet guide vanes 352, which can be a second stage of airfoils in the non-limiting example. Moreover, a downstream section 354 of the nacelle 350 extends over an outer portion of the turbomachine 316 so as to define a bypass airflow passage 356 therebetween.

It will be understood that each fan blade of the plurality of fan blades 340 may form a composite airfoil and that the plurality of fan blades 340 can form a first stage of airfoils as described above. More specifically, each of the plurality of fan blades 340 can include a first leading edge protector 340a. It will be understood that the plurality of fan blades forming the first stage of airfoils are similar to the previously described airfoils 130 and 230a with it being understood that the description of like parts applies to the plurality of fan blades unless otherwise noted.

Further still, it will be understood that each outlet guide vane of the plurality of outlet guide vanes 352 may form a composite airfoil. Further still, in the illustrated example, the plurality of outlet guide vanes 352 can form a second stage of airfoils as described above. More specifically, each of the plurality of outlet guide vanes 352 can include a second leading edge protector 352a. It will be understood that an outlet guide vane of the plurality of outlet guide vanes 352 forming the second stage of airfoils is similar to the previously described airfoils 130 and 230b with it being understood that the description of like parts applies to the outlet guide vane of the plurality of outlet guide vanes 352 unless otherwise noted.

It will be understood that the plurality of fan blades 340 and the plurality of outlet guide vanes 352 are similar to the previously described first and second airfoil pairs with dimensions fitting in the ranges set out in TABLE 4 above.

During operation of the gas turbine engine 310, a volume of air 358 enters the gas turbine engine 310 through an associated inlet 360 of the nacelle 350 and fan section 314. As the volume of air 358 passes across the fan blades 340, a first portion of air 362 is directed or routed into the bypass airflow passage 356 and a second portion of air 364 as indicated by arrow 364 is directed or routed into the working gas flow path 337, or more specifically into the LP compressor 322. The ratio between the first portion of air 362 and the second portion of air 364 is commonly known as a bypass ratio. A pressure of the second portion of air 364 is then increased as it is routed through the HP compressor 324 and into the combustion section 326, where it is mixed with fuel and burned to provide combustion gases 366.

The combustion gases 366 are routed through the HP turbine 328 where a portion of thermal and/or kinetic energy from the combustion gases 366 is extracted via sequential stages of HP turbine stator vanes 368 that are coupled to the outer casing 318 and HP turbine rotor blades 370 that are coupled to the HP shaft 334, thus causing the HP shaft 334 to rotate, which supports operation of the HP compressor 324. The combustion gases 366 are then routed through the LP turbine 330 where a second portion of thermal and kinetic energy is extracted from the combustion gases 366 via sequential stages of LP turbine stator vanes 372 that are coupled to the outer casing 318 and LP turbine rotor blades 374 that are coupled to the LP shaft 336, thus causing the LP shaft 336 to rotate, which supports operation of the LP compressor 322, rotation of the fan 338, or a combination thereof.

The combustion gases 366 are subsequently routed through the jet exhaust nozzle section 332 of the turbomachine 316 to provide propulsive thrust. Simultaneously, the pressure of the first portion of air 362 is substantially increased as the first portion of air 362 is routed through the bypass airflow passage 356 before it is exhausted from a fan nozzle exhaust section 376 of the gas turbine engine 310, also providing propulsive thrust. The HP turbine 328, the LP turbine 330, and the jet exhaust nozzle section 332 at least partially define a hot gas path 378 for routing the combustion gases 366 through the turbomachine 316.

As previously described, the stages of airfoils exemplary gas turbine engine 310 depicted in FIG. 5 is by way of example only, and in other exemplary embodiments, the gas turbine engine 310 may have other configurations. For example, although the gas turbine engine 310 depicted is configured as a ducted gas turbine engine (i.e., including the outer nacelle 350, also referred to herein as a turbofan engine), in other embodiments, the gas turbine engine 310 may be an unducted gas turbine engine (such that the fan 338 is an unducted fan, and the outlet guide vanes 352 are cantilevered from the outer casing 318; see, e.g., FIG. 6; also referred to herein as an open rotor engine). Additionally, or alternatively, although the gas turbine engine 310 depicted is configured as a variable pitch gas turbine engine (i.e., including a fan 338 configured as a variable pitch fan), in other embodiments, the gas turbine engine 310 may alternatively be configured as a fixed pitch gas turbine engine (such that the fan 338 includes fan blades 340 that are not rotatable about a pitch axis P).

Figure 6:
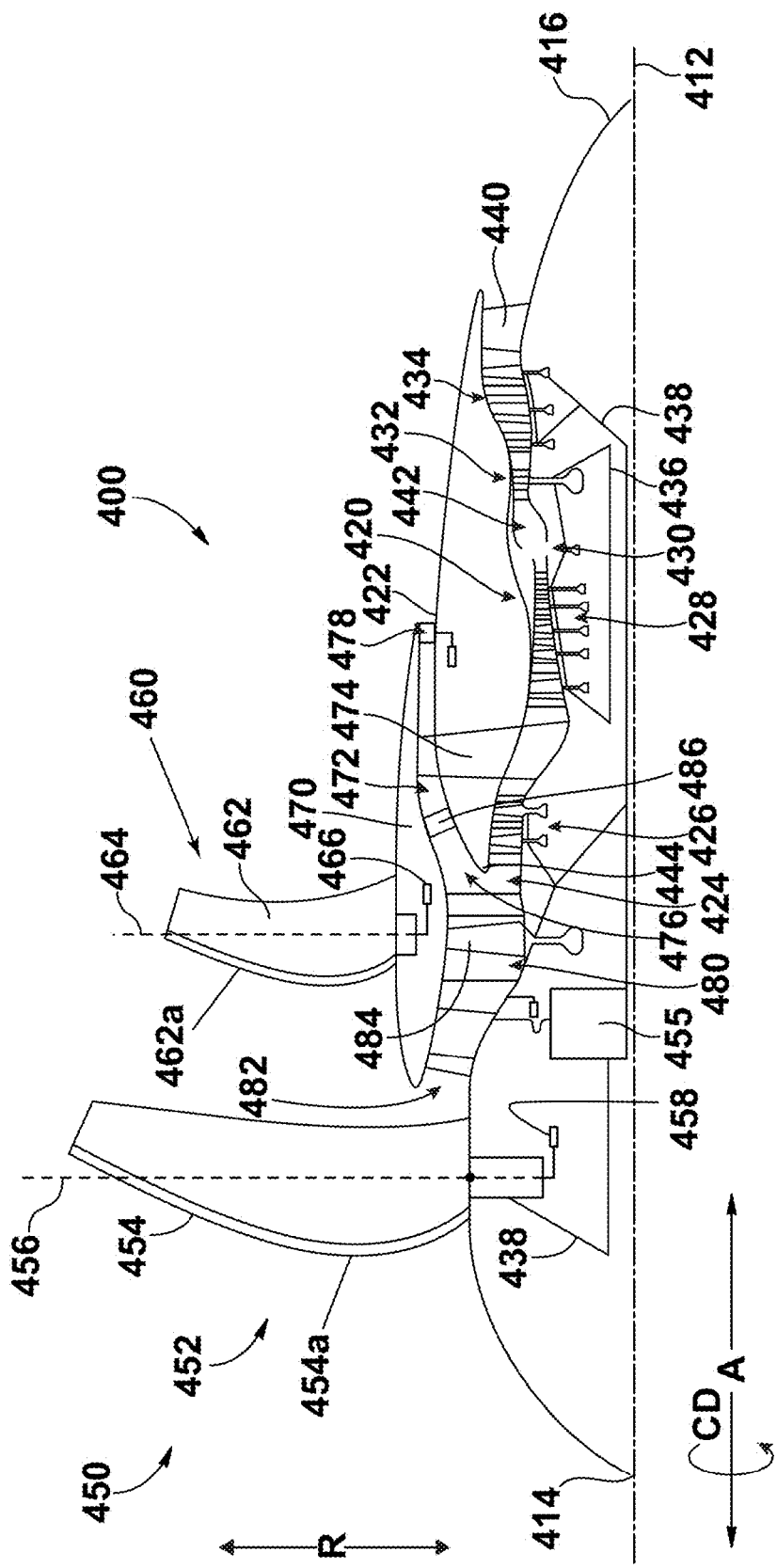
FIG. 6 is a schematic cross-sectional view of a gas turbine engine in accordance with another exemplary embodiment of the present disclosure.

FIG. 6, illustrates another non-limiting example of a gas turbine engine 400, which can include the set of composite airfoils or first and second stages of composite airfoils as described herein. The exemplary gas turbine engine 400 of FIG. 4 may be configured in substantially the same manner as the exemplary gas turbine engine 310 described above with reference to FIG. 5.

For example, the exemplary gas turbine engine 400 defines an axial direction A, a radial direction R, and a circumferential direction CD. Moreover, the engine 400 defines an axial centerline, longitudinal axis, or engine centerline 412 that extends along the axial direction A. In general, the axial direction A extends parallel to the engine centerline 412, the radial direction R extends outward from and inward to the engine centerline 412 in a direction orthogonal to the axial direction A, and the circumferential direction CD extends three hundred sixty degrees (360°) around the engine centerline 412. The engine 400 extends between a forward end 414 and an aft end 416, e.g., along the axial direction A.

Further, the exemplary gas turbine engine 400 generally includes a fan section 450 and a turbomachine 420. Generally, the turbomachine 420 includes, in serial flow order, a compressor section, a combustion section, a turbine section, and an exhaust section. In a non-limiting example, the turbomachine 420 includes a core cowl 422 that defines a core inlet 424 that is annular. The core cowl 422 further encloses at least in part a low pressure system and a high pressure system. For example, the core cowl 422 depicted encloses and supports at least in part a booster or low pressure ("LP") compressor 426, a high pressure ("HP") compressor 428, a combustor 430, a high pressure turbine 432, and a low pressure turbine 434. The high pressure turbine 432 drives the high pressure compressor 428 through a high pressure shaft 436. The low pressure turbine 434 drives the low pressure compressor 426 and components of the fan section 450 through a low pressure ("LP") shaft 438. After driving each of the high pressure turbine 432 and the low pressure turbine 434, combustion products exit the turbomachine 420 through a turbomachine exhaust nozzle 440.

In this manner, the turbomachine 420 defines a working gas flow path or core duct 442 that extends between the core inlet 424 and the turbomachine exhaust nozzle 440. The core duct 442 is an annular duct positioned generally inward of the core cowl 422 along the radial direction R. The core duct 442 may be referred to as a second stream.

The fan section 450 includes a fan 452, which is the primary fan in non-limiting example. One difference is that the fan 452 is an open rotor or unducted fan. In such a manner, the gas turbine engine 400 may be referred to as an open rotor engine. The fan 452 includes fan blades 454, while only a single flan blade is illustrated in FIG. 6 it will be understood that an array of fan blades are included. Moreover, the fan blades 454 can be arranged in equal spacing around the engine centerline 412. Each fan blade 454 has a root and a tip and a span defined therebetween. Each fan blade 454 defines a central blade axis 456. For this embodiment, each fan blade 454 of the fan 452 is rotatable about its central blade axis 456, e.g., in unison with one another. One or more actuators 458 are provided to facilitate such rotation and therefore may be used to change a pitch of the fan blades 454.

The fan blades 454 are rotatable about the engine centerline 412. As noted above, the fan 452 is drivingly coupled with the low pressure turbine 434 via the LP shaft 438. In a non-limiting example, the fan 452 is coupled with the LP shaft 438 via a speed reduction device, which can include by way of non-limiting examples a power gearbox or a speed reduction gearbox 455, e.g., in an indirect-drive or geared-drive configuration.

The fan section 450 further includes a fan guide vane array 460 that includes fan guide vanes 462, again while only one fan guide vane is shown in FIG. 6 it will be understood that the fan guide vanes 462 are disposed around the engine centerline 412. The fan guide vanes 462 are mounted to the fan cowl 470. In a non-limiting example, the fan guide vanes 462 are not rotatable about the engine centerline 412. Each of the fan guide vanes 462 has a root and a tip and a span defined therebetween. The fan guide vanes 462 may be unshrouded as shown in FIG. 6 or, alternatively, may be shrouded, e.g., by an annular shroud spaced outward from the tips of the fan guide vanes 462 along the radial direction R or attached to the fan guide vanes 462.

Each fan guide vane 462 defines a central blade axis 464. By way of non-limiting example, each of the fan guide vanes 462 of the fan guide vane array 460 is rotatable about its respective central blade axis 464, e.g., in unison with one another. One or more actuators 466 are provided to facilitate such rotation and therefore may be used to change a pitch of the fan guide vane 462 about its respective central blade axis 464. However, in other embodiments, each of the fan guide vanes 462 may be fixed or unable to be pitched about its central blade axis 464.

It will be understood that each of the fan blades 454 may form a composite airfoil and that the fan blades 454 can form a first stage of airfoils as described above. More specifically, each of the fan blades 454 can include a first leading edge protector 454a. It will be understood that the fan blades 454 forming the first stage of airfoils are similar to the previously described airfoils 130, 230a, and 340 with it being understood that the description of like parts applies to the fan blades unless otherwise noted.

Further still, it will be understood that each of the fan guide vanes 462 may form a composite airfoil. Further still, in the illustrated example, the fan guide vanes 462 can form a second stage of airfoils as described above. More specifically, each of the fan guide vanes 462 can include a second leading edge protector 462a. It will be understood that the fan guide vanes 462 forming the second stage of airfoils is similar to the previously described airfoils 130, 230b, and 352 with it being understood that the description of like parts applies to the fan guide vanes 462 unless otherwise noted.

It will be understood that the fan blades 454 and the fan guide vanes 462 are similar to the previously described first and second airfoil pairs with dimensions fitting in the ranges set out in TABLE 4 above.

Another difference is that the illustrated example in FIG. 6, in addition to the unducted fan 452, shows a ducted fan 484 included aft of the fan 452. In this manner, the engine 400 includes both a ducted fan 484 and an unducted fan 452, which both serve to generate thrust through the movement of air without passage through at least a portion of the turbomachine 420 (e.g., without passage through the HP compressor 428 and combustion section for the embodiment depicted). The ducted fan 484 is rotatable about the engine centerline 412. The ducted fan 484 is, by way of non-limiting example, driven by the low pressure turbine 434 (e.g., coupled to the LP shaft 438). The fan 452 may be referred to as the primary fan, and the ducted fan 484 may be referred to as a secondary fan. It will be appreciated that these terms "primary" and "secondary" are terms of convenience, and do not imply any particular importance, power, or the like.

The ducted fan 484 includes a plurality of fan blades (not separately labeled in FIG. 6) arranged in a single stage, such that the ducted fan 484 may be referred to as a single stage fan. The fan blades of the ducted fan 484 can be arranged in equal spacing around the engine centerline 412. Each blade of the ducted fan 484 has a root and a tip and a span defined therebetween.

The fan cowl 470 annularly encases at least a portion of the core cowl 422 and is generally positioned outward of at least a portion of the core cowl 422 along the radial direction R. Particularly, a downstream section of the fan cowl 470 extends over a forward portion of the core cowl 422 to define a fan duct flow path, or simply a fan duct 472. The fan flow path or fan duct 472 may be understood as forming at least a portion of the third stream of the engine 400.

Incoming air may enter through the fan duct 472 through a fan duct inlet 476 and may exit through a fan exhaust nozzle 478 to produce propulsive thrust. The fan duct 472 is an annular duct positioned generally outward of the core duct 442 along the radial direction R. The fan cowl 470 and the core cowl 422 are connected together and supported by a plurality of substantially radially extending, circumferentially-spaced stationary struts 474 (only one of which is shown in FIG. 6). The stationary struts 474 may each be aerodynamically contoured to direct air flowing thereby. Other struts in addition to the stationary struts 474 may be used to connect and support the fan cowl 470, the core cowl 422, or a combination thereof. In many embodiments, the fan duct 472 and the core duct 442 may at least partially co-extend axially on opposite radial sides of the core cowl 422. For example, the fan duct 472 and the core duct 442 may each extend directly from a leading edge 444 of the core cowl 422 and may partially co-extend generally axially on opposite radial sides of the core cowl 422.

The engine 400 also defines or includes an inlet duct 480. The inlet duct 480 extends between the engine inlet 482 and the core inlet 424, the fan duct inlet 476, or a combination thereof. The engine inlet 482 is defined generally at the forward end of the fan cowl 470 and is positioned between the fan 452 and the fan guide vane array 460 along the axial direction A. The inlet duct 480 is an annular duct that is positioned inward of the fan cowl 470 along the radial direction R. Air flowing downstream along the inlet duct 480 is split, not necessarily evenly, into the core duct 442 and the fan duct 472 by a fan duct splitter or leading edge 444 of the core cowl 422. In the embodiment depicted, the inlet duct 480 is wider than the core duct 442 along the radial direction R. The inlet duct 480 is also wider than the fan duct 472 along the radial direction R.

Air passing through the fan duct 472 may be relatively cooler than one or more fluids utilized in the turbomachine 420. In this way, one or more heat exchangers 486 may be positioned in thermal communication with the fan duct 472. For example, one or more heat exchangers 486 may be disposed within the fan duct 472 and utilized to cool one or more fluids from the core engine with the air passing through the fan duct 472, as a resource for removing heat from a fluid, e.g., compressor bleed air, oil, or fuel. The heat exchanger 486 may be an annular heat exchanger.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

It will be understood that a speed reduction device including, but not limited to, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable cover with a leading edge protector length allowing for sufficient leading edge protection.

Benefits associated with the SPF described herein include a quick assessment of design parameters in terms of composite airfoils in downstream relationship. Further, the SPF described herein enables a quick visualization of tradeoffs in terms of geometry that are bounded by the constraints imposed by the materials used, the available space in which the composite airfoils are located, the type of turbine engine or system enclosures and the configuration of surrounding components, or any other design constraint. The SPF enables the manufacturing of a high performing composite airfoil with peak performance with the factors available. While narrowing these multiple factors to a region of possibilities saves time, money, and resources, the largest benefit is at the system level, where the composite airfoils described herein enable improved system performance. Previously developed composite airfoils may peak in one area of performance by design, but lose efficiency or lifetime benefits in another area of performance. In other words, the stage performance factor enables the development and production of higher performing composite airfoils across multiple performance metrics within a given set of constraints.

As will be appreciated from the description above, an airfoil protection factor (APF) may be used to select an amount of coverage provided by a leading edge protector based on the leading edge length LL and the chord length CL of the airfoil. The APF is particularly important when considering weight requirements of a gas turbine engine. For example, the additional weight added by including some leading edge protectors can be offset by weight savings from airfoils formed of composite materials. Additionally, such composite materials may improve airfoil stiffness and strength, which can also improve durability of the airfoils, particularly in the event of a foreign object encounter, such as bird strikes.

Figure 7:
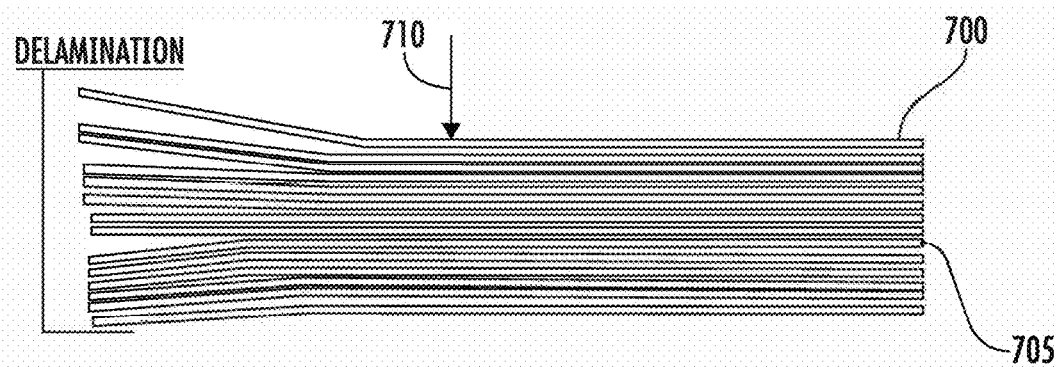
FIG. 7 is a schematic representation of the delamination of carbon composite fiber layers in the prior art when a load is applied on a blade.

It has further been found that airfoils formed of composite materials can include at least two types of fibers. For example, a plurality of first fibers can be utilized to increase stiffness and strength of the airfoils and a plurality of second fibers can be utilized to provide flexibility to the airfoils. Such stiffness and strength improves the durability of the airfoils upon impact with foreign objects while the flexibility can also resist high strains and loads induced by bending deformations caused by such impact. Moreover, including various types of fibers can also prevent delamination of composite fiber layers at free edges when a load 710 is applied to the airfoils, such as shown in FIG. 7 with respect to carbon composite fiber layers 705 of airfoil 700.

Such a configuration of airfoils formed of various types of fibers was found to be particularly useful when utilized with the leading edge protector contemplated by the APF and SPF relationships above, given an amount of stress absorbed by the leading edge protector contemplated by the APF and SPF relationships above. In particular, the airfoils formed of the various types of fibers in combination with such a leading edge protector can have the stiffness and strength to better withstand impact from, e.g., bird strikes given the combination of fibers providing both stiffness and strength and the leading edge protector distributing an initial stress of such impact. Moreover, the airfoils formed of the various types of fibers in combination with such a leading edge protector can further include flexibility to reduce the strain caused by bending deformations upon impact with foreign objects.

Accordingly, the present disclosure provides an arrangement of various types of composite fiber plies forming an airfoil in combination with a leading edge protector contemplated by the APF and SPF relationships disclosed herein, resulting in a gas turbine engine having improved durability, improved system performance, and weight savings.

Figure 8:
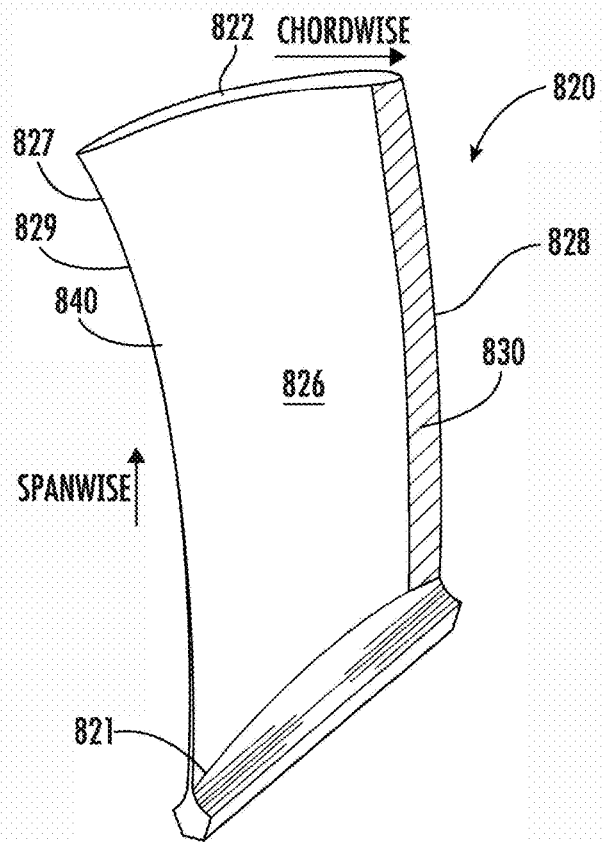
FIG. 8 is a perspective view of a fan blade in accordance with an exemplary embodiment of the present disclosure.

FIG. 8 shows a blade (also referred to as an airfoil) in accordance with an exemplary embodiment of the present disclosure. More particularly, the blade shown in FIG. 8 may be employed in gas turbines of aircrafts. In addition, the present disclosure as shown and described herein is not limited to be used in an aero engine (turbine), a land based and/or industrial turbine unless otherwise specified.

As shown in FIG. 8, blade 820 can be a fan blade which includes a root 821 by which blade 820 is coupled to a rotor disc and a tip 822 opposite to root 821. It will be seen that blade 820 includes a concave pressure side 826 and a convex suction side 827 opposite the concave pressure side 826 extending in chordwise direction from a leading edge 828 to a trailing edge 829, respectively. Also, concave pressure side 826 and convex suction side 827 extend in a spanwise direction from root 821 to tip 822, respectively. It should be appreciated that the concave pressure side 826 includes a first surface and the convex suction side 827 includes a second surface.

The blade 820 comprises a plurality of first composite fiber plies 840 and a plurality of second composite fiber plies 830. The second composite fiber plies may be prone to suffering from high strain. In at least one example embodiment, the second composite fiber plies 830 are disposed at the leading edge 828 of the blade 820 in this embodiment. Alternatively, the second composite fiber plies 830 may be disposed at the trailing edge 829 of the blade 820. In still other example embodiments, the second composite fiber plies 830 are disposed at both of the leading edge 828 and the trailing edge 829 of the blade 820. The first composite fiber plies 840 extend in the chordwise direction from the leading edge 828 to the trailing edge 829 and in the spanwise direction from the root 821 to the tip 822.

The first composite fiber plies 840 may include carbon fibers, which have comparatively high stiffness and strength. However, if the blade 820 has the first composite fiber plies 840 (for example, carbon fiber plies) only, it is not sufficient for the blade 820 to resist the high strain induced by bending deformations coming from the external load during a bird strike. Thus, the second composite fiber plies 830 (for example, glass, aramid, polymer, basalt fiber plies or a combination thereof) may be included in combination with the first composite fiber plies 840 to resist the high strain. For example, glass composite fibers have the ability of withstanding higher strain to failure compared to carbon composite fibers. The second composite fiber plies 830 may include various kinds of fibers with high strain resistance. Preferably, the second composite fiber plies 830 may be glass fibers.

Figure 9:
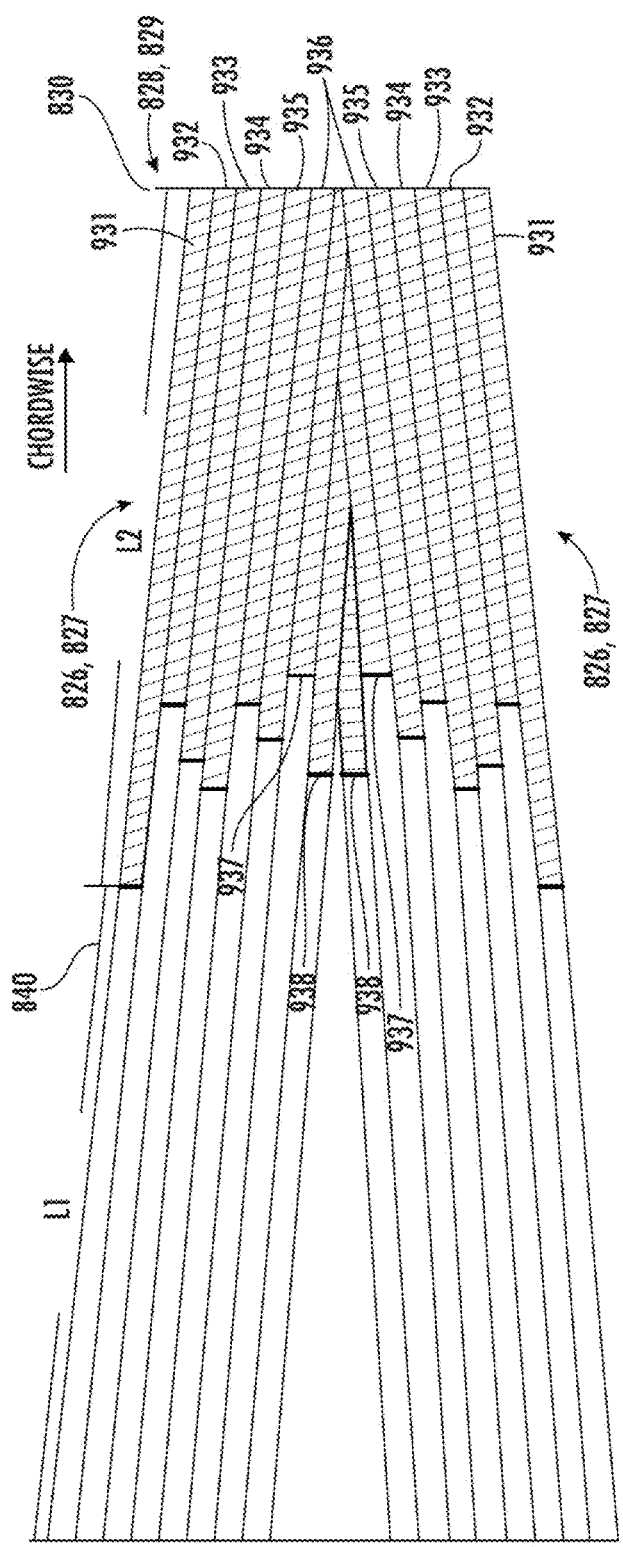
FIG. 9 is an illustrative cross-sectional view of a leading or a trailing edge of a blade in accordance with an exemplary embodiment of the present disclosure.

FIG. 9 illustrates a cross-sectional view of a leading or a trailing edge of a blade in accordance with an exemplary embodiment of the present disclosure. As shown in FIG. 9, a plurality of second composite fiber plies 830 are used to provide the leading edge 828 or the trailing edge 829 with more strain-resistance protection. In at least one example embodiment, a plurality of the second composite fiber plies 830 include spanwise fiber plies 931, 933, 935 decreasing both in chordwise length and in spanwise length monotonically from surface of the blade inwardly. In another example embodiment, a plurality of the second composite fiber plies 830 include non-spanwise fiber plies 932, 934, 936 not monotonically decreasing or increasing from surface of the blade inwardly.

In additional example embodiments, a plurality of the second composite fiber plies 830 include spanwise fiber plies decreasing both in chordwise length and in spanwise length monotonically from the surface of the blade inwardly and non-spanwise fiber plies not monotonically decreasing or increasing from the surface of the blade inwardly. More particularly, the second composite fiber plies 830 include a first spanwise fiber ply 931, a first non-spanwise fiber ply 932, a second spanwise fiber ply 933, a second non-spanwise fiber ply 934, a third spanwise fiber ply 935, a third non-spanwise fiber ply 936, a fourth spanwise fiber ply 937, and a fourth non-spanwise fiber ply 938 extending from leading edge 828 towards trailing edge 829 (or from trailing edge 829 towards leading edge 828) and extending from the surfaces 826, 827 inwardly. The spanwise fiber plies include the first spanwise fiber ply 931, the second spanwise fiber ply 933, the third spanwise fiber ply 935, and the fourth spanwise fiber ply 937. These spanwise fiber plies have fibers arranged in the spanwise direction, which means the fibers in the spanwise fiber plies have 0° orientation relative to the spanwise direction of the blade 820. For example, the fibers in these spanwise fiber plies are oriented in a direction parallel to the spanwise direction of the blade 820. The non-spanwise fiber plies include the first non-spanwise fiber ply 932, the second non-spanwise fiber ply 934, the third non-spanwise fiber ply 936, and the fourth non-spanwise fiber ply 938. These non-spanwise fiber plies have fibers arranged at an angle relative to the spanwise direction of the blade 820. The selection of the angle of fibers in non-spanwise fiber plies will be discussed in the following description accompanying FIGS. 15-17.

Figure 10:
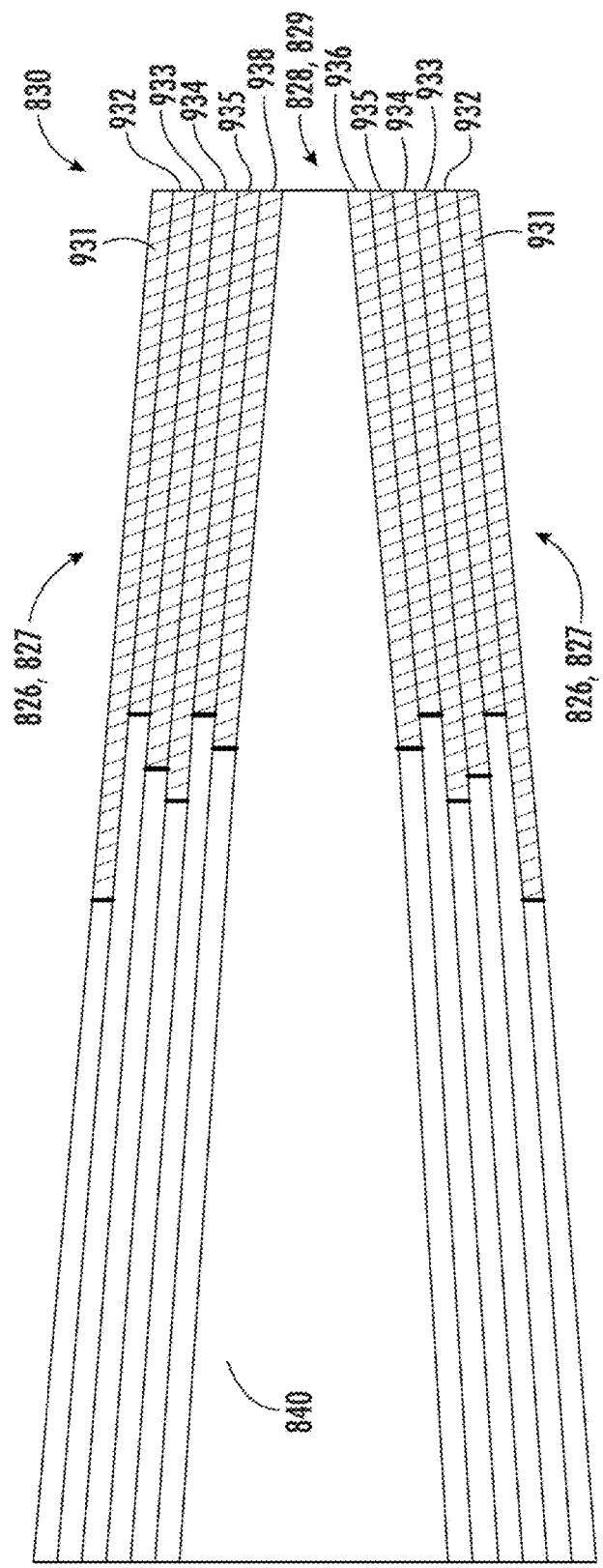
FIG. 10 is an illustrative cross-sectional view of a leading or a trailing edge of a blade in accordance with an exemplary embodiment of the present disclosure.

As shown in FIG. 9, there are eight second composite fiber plies laid on surfaces 826, 827. However, the number of the second composite fiber plies of blade 820 is merely for purposes of illustration and discussion and is not intended for limitation. Those of ordinary skill in the art, using the disclosures provided herein, shall understand that the number of the second composite fiber plies and/or the first composite fiber plies of blade 820 can be adjusted without deviating from the scope of the present disclosure. In at least one example embodiment, there are six second composite fiber plies laid on both surfaces 826, 827, as depicted in FIG. 10. Alternatively, there are more than eight second composite fiber plies laid on both surfaces 826, 827. In another example embodiment, the number of second composite fiber plies laid on one of surfaces 826, 827 could be less than or more than that of the other one of surfaces 826, 827, which means the number of the first composite fiber plies and/or the second composite fiber plies laid on the surface 826 is different from that laid on surface 827. More particularly, there may be eight second composite fiber plies laid on one of surfaces 826, 827, while there may be ten second composite fiber plies laid on the other one of surfaces 826, 827.

Still referring to FIG. 9, the first composite fiber plies 840 (for example, carbon fiber plies) do not extend to the end of leading edge 828 and/or the end of trailing edge 829, which means the leading edge 828 or trailing edge 829 has the second composite fiber plies 830 only, for example, glass fiber plies. The thickness of blade 820 tapers from middle portion of blade 820 to edge portion of blade. For example, the thickness of blade 820 is thicker in the middle portion and thinner in the edge portions (including the leading edge 828 and trailing edge 829) since no carbon fiber layers exists in these portions. The number of glass fiber plies applied leads to the amount of chordwise length where the portion of leading edge or the portion of trailing edge is entirely covered by glass fiber plies. The more glass fiber plies that are added, the more a portion of the trailing edge or the leading edge becomes entirely-glass. Accordingly, the trailing edge 829 or the leading edge 828 of the blade 820 can withstand higher strain, such as during a bird impact, because the glass fiber plies have higher strain to failure than that of carbon fiber plies. Therefore, the trailing edge and/or the leading edge including entirely-glass fiber plies offers an improved bird-strike capability.

Those fibers in one individual ply that extend, or substantively extend, in one direction are called unidirectional fibers. Those fibers in one individual ply that extend in different directions are called non-unidirectional fibers. Preferably, the second composite fiber plies 830 are made of unidirectional fibers since the unidirectional fibers have better property (i.e., higher strength) than that of non-unidirectional fibers and could withstand higher load compared to the non-unidirectional fibers.

FIG. 10 illustrates a cross-section view of a leading or a trailing edge of a blade in accordance with an exemplary embodiment of the present disclosure. As shown in FIG. 10, a plurality of second composite fiber plies 830 are used to provide the leading edge 828 or the trailing edge 829 with more strain-resistance protection. The second composite fiber plies 830 comprise the first spanwise fiber ply 931, the first non-spanwise fiber ply 932, the second spanwise fiber ply 933, the second non-spanwise fiber ply 934, the third spanwise fiber ply 935, and the third non-spanwise fiber ply 936 extending from leading edge towards trailing edge (or from trailing edge towards leading edge) and extending from the surfaces 26, 27 inwardly. The spanwise fiber plies include the first spanwise fiber ply 931, the second spanwise fiber ply 933, and the third spanwise fiber ply 935. These spanwise fiber plies have fibers arranged in the spanwise direction, which means the fibers in the spanwise fiber plies are oriented 0° relative to the spanwise direction of the blade 820. For example, the fibers in these spanwise fiber plies are oriented in a direction parallel to the spanwise direction of the blade 820. The non-spanwise fiber plies include the first non-spanwise fiber ply 932, the second non-spanwise fiber ply 934, and the third non-spanwise fiber ply 936. Different from the first composite fiber plies shown in FIG. 9, the first composite fiber plies 840 extend to the end of leading edge and/or the end of trailing edge. Accordingly, the second composite fiber plies and the first composite fiber plies are both present in the leading edge and/or trailing edge.

Figure 11:
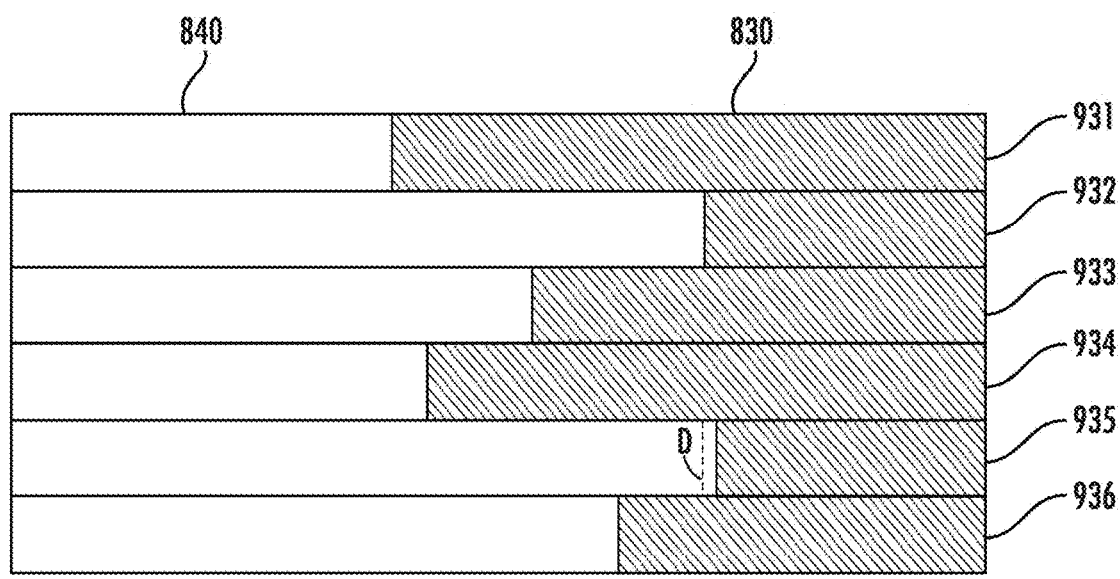
FIG. 11 illustratively shows an enlarged cross-sectional view of a leading or a trailing edge of a blade in accordance with an exemplary embodiment of the present disclosure.

FIG. 11 illustrates an enlarged cross-sectional view of a leading or a trailing edge of a blade in accordance with an exemplary embodiment of the present disclosure. As shown in FIGS. 9 and 10, the non-spanwise fiber plies 32, 34 are arranged between two adjacent spanwise fiber plies 31, 33, 35. This means the two adjacent spanwise fiber plies are spaced by one non-spanwise fiber ply. Accordingly, the two adjacent non-spanwise fiber plies are also spaced by one spanwise fiber ply. For example, the first spanwise fiber ply 931 and the second spanwise fiber ply 933 are spaced by the first non-spanwise fiber ply 932.

FIG. 11 illustratively shows ends of the second composite fiber plies that are staggered in the chordwise direction of the blade (also shown in FIG. 10). In the chordwise direction, ends of the first spanwise fiber ply 931, the first non-spanwise fiber ply 932, the second spanwise fiber ply 933, the second non-spanwise fiber ply 934, the third spanwise fiber ply 935, and the third non-spanwise fiber ply 936 are staggered so as to form an interlock between the first composite fiber plies and the second composite fiber plies, which prevents the plural adjacent second composite fiber plies (e.g., two or more than two adjacent second composite fiber plies) from ending at the same spot.

Figure 12:
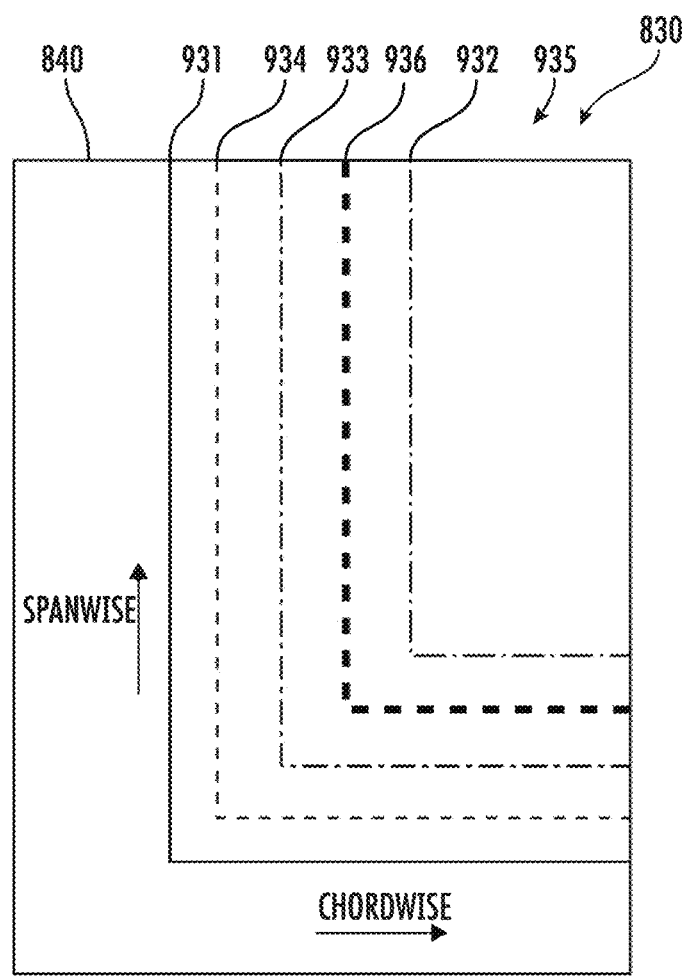
FIG. 12 partly and illustratively shows view of surface of a leading or a trailing edge of a blade in accordance with an exemplary embodiment of the present disclosure.

FIG. 12 illustratively shows ends of the second composite fiber plies staggered in the spanwise direction of the blade in accordance with an exemplary embodiment of the present disclosure. As shown in FIG. 12, the second composite fiber plies 830 may be disposed at the leading edge 828 or the trailing edge 829 of the blade 820, and each of the second composite fiber plies 830 is a part of one whole layer of blade 820. In one whole layer of the blade 820, the first composite fiber ply and the second composite fiber ply are two separate pieces that are combined together to form one whole layer. In the spanwise direction, ends of the first spanwise fiber ply 931, the first non-spanwise fiber ply 932, the second spanwise fiber ply 933, the second non-spanwise fiber ply 934, the third spanwise fiber ply 935, and the third non-spanwise fiber ply 936 are also staggered so as to form an interlock between the first composite fiber plies 840 and the second composite fiber plies 830, which prevents the plural adjacent second composite fiber plies (e.g., two or more than two adjacent second composite fiber plies) from ending at the same spot. Except for the first spanwise fiber ply 931 being represented in solid line, the other second composite fiber plies 932, 933, 934, 935, 936 are represented in broken lines, such as dotted lines and dot-dash lines. It is noted that the smallest rectangle area represents two second composite fiber plies 932, 935, wherein one is the first non-spanwise fiber ply 932, and the other is the third spanwise fiber ply 935 though the first non-spanwise fiber ply 932 and the third spanwise fiber ply 935 are overlapped in one area in FIG. 12.

As shown in FIGS. 11 and 12, the second composite fiber plies end differently in both the chordwise direction and in the spanwise direction, which creates a staggered, interlocked pattern. The interlock depends on how the second composite fiber plies terminate at the end. The interlock used herein is formed in a region where the material transitions from one to another, for example, from all carbon to carbon and glass, and then to all glass. There will be a quick change in material properties in this region. The ends of the second composite fiber plies may be designed to be staggered in the chordwise direction and/or in the spanwise direction of the blade, which is beneficial to smooth such material transition. Accordingly, such interlock may prevent delamination of the second composite fiber plies and/or the first composite fiber plies.

Figure 13:
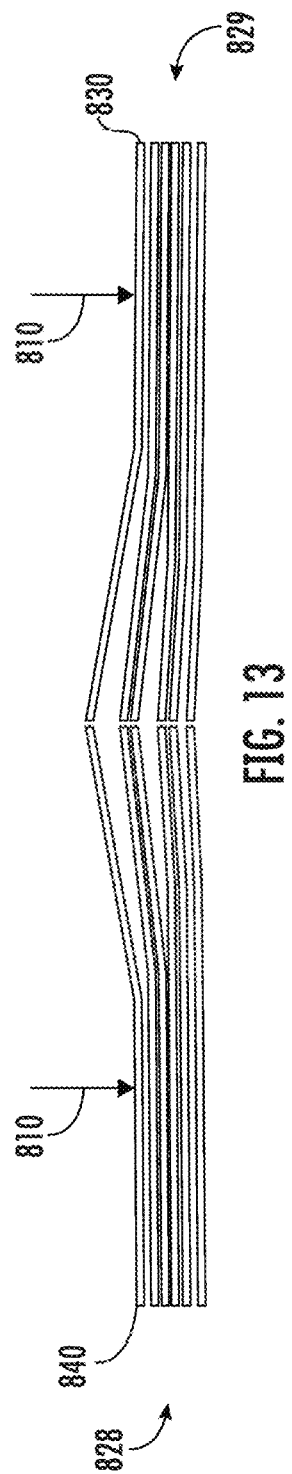
FIG. 13 is a schematic representation of the delamination of first composite fiber plies and second composite fiber plies when the load is applied on them in accordance with an exemplary embodiment of the present disclosure.

FIG. 13 shows the delamination of the first composite fiber plies and the second composite fiber plies when a load 810 is applied on them. As shown in FIG. 13, ends of all six second composite fiber plies are aligned. For example, they all end at the same or the substantially same spot, which will create a local strength weakness, leading to the disengagement of the first composite fiber plies and the second composite fiber plies while causing delamination between the plies of the first composite fiber plies and delamination between the plies of second composite fiber plies. Moreover, a local strength weakness may be created if only two or three adjacent second composite fiber plies, rather than all six second composite fiber plies, end at the same or substantially the same spot.

In consideration of the overall second composite fiber plies, length of second composite fiber plies changes irregularly. Chordwise length used herein means the length size of second composite fiber ply or first composite fiber ply extending from the leading edge 828 to the trailing edge 829. Spanwise length used herein means the length size of second composite fiber ply or first composite fiber ply extending from the root 821 to the tip 822.

In consideration of the spanwise fiber plies of the second composite fiber plies only, lengths of spanwise fiber plies change regularly. For example, the chordwise length and the spanwise length of spanwise fiber plies decrease monotonically from the first surface inwardly. As shown in FIG. 11, the chordwise length and the spanwise length of the first spanwise fiber ply 931, the second spanwise fiber ply 933, and the third spanwise fiber ply 935 decrease successively (along the solid slash in FIG. 11) from surface toward interior. In consideration of the non-spanwise fiber plies only, lengths of non-spanwise fiber plies do not decrease or increase monotonically from surface toward interior. Namely, neither chordwise length nor spanwise length of non-spanwise fiber plies decreases or increases monotonically from surface toward interior.

Figure 14:
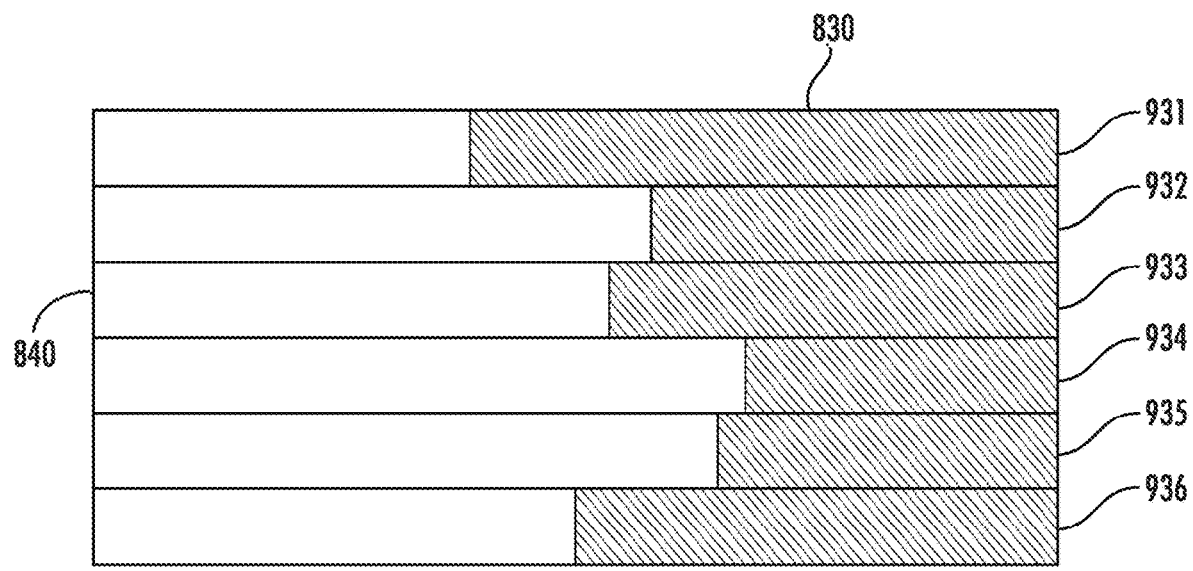
FIG. 14 is an enlarged and partial cross-sectional view of a leading or a trailing edge of a blade in accordance with an exemplary embodiment of the present disclosure.

FIG. 14 is an enlarged and partial cross-sectional view of a leading or a trailing edge of a blade in accordance with an embodiment of the present disclosure. As shown in FIG. 14, the blade comprises a plurality of first composite fiber plies and a plurality of second composite fiber plies. The first composite fiber plies and the second composite fiber plies are configured in the similar way as those shown in FIG. 11. The chordwise length of the first spanwise fiber ply 931, the second spanwise fiber ply 933, and the third spanwise fiber ply 935 decreases successively (along the solid slash). Meanwhile, the spanwise length of the first spanwise fiber ply 931, the second spanwise fiber ply 933, and the third spanwise fiber ply 935 also decreases successively from the surface toward interior (not shown in the figures but similar to what is represented in FIG. 12). While the chordwise length and the spanwise length of non-spanwise fiber plies 32, 34, and 36 do not decrease or increase monotonically from surface toward interior either.

Figure 15:
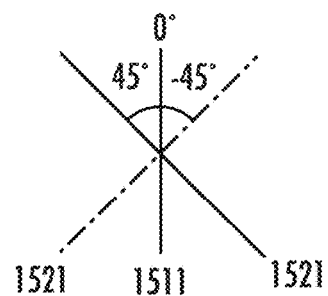
FIGS. 15-17 illustratively show the orientation of fibers in the non-spanwise fiber plies and in the spanwise fiber plies when they are manufactured into a plurality of second composite fiber plies in accordance with an exemplary embodiment of the present disclosure.
Figure 16:
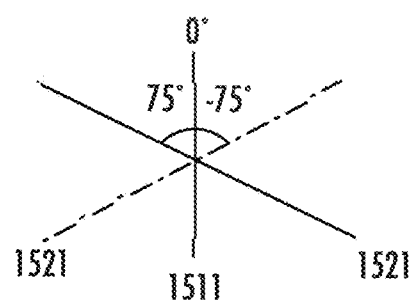
Figure 17:
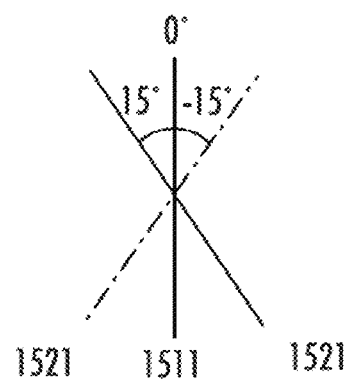

FIGS. 15-17 show the orientation of fibers in the non-spanwise fiber plies and in the spanwise fiber plies when they are manufactured together. Referring to FIG. 15, along with FIGS. 10 and 11, the first spanwise fiber ply 931 has fibers 1511 which are parallel to the spanwise direction of the blade (0° relative to the spanwise direction of the blade). The first non-spanwise fiber ply 932 adjacently disposed below the first spanwise fiber ply 931 has fibers 1521 which are oriented at an angle of 45° relative to the spanwise direction of the blade (shown with the solid line). Additionally, or alternatively, the first non-spanwise fiber ply may include fibers 1521 which are oriented at an angle of −45° relative to the spanwise direction of the blade (shown with the dashed line). Optionally, as shown in FIG. 16, the first non-spanwise fiber ply has fibers 1521 which are oriented at an angle of 75° relative to the spanwise direction of the blade (shown with the solid line), or has fibers 1521 are oriented at an angle of −75° relative to the spanwise direction of the blade (shown with the dashed line). Alternatively, as shown in FIG. 17, the first non-spanwise fiber ply has fibers 1521 which are oriented at an angle of 15° relative to the spanwise direction of the blade (shown with the solid line), or has fibers 1521 are oriented at an angle of −15° relative to the spanwise direction of the blade (shown with the dashed line). Typically, the fibers woven in the first non-spanwise fiber ply can be oriented at an angle ranging from ±15° to ±75° relative to spanwise direction of the blade.

In at least one example embodiment, the first non-spanwise fiber ply could have fibers oriented at angle of 45°, the second non-spanwise fiber ply could have fibers oriented at angle of 15° (or 30°), and the third non-spanwise fiber ply could have fibers oriented at angle of 75° (or 60°). Hence, the whole second composite fiber ply system includes different fibers oriented in different directions which is beneficial to improve the strength and stiffness of the system. The spanwise fiber plies takes the majority of load since they are oriented parallel to the spanwise direction of the blade. The external load comes from multiple directions. If the fibers of all the plies run in only one direction, it would be strong in that direction, but will actually result in reduced strength in the other directions. The configuration of the fibers in non-spanwise fiber plies in other directions makes the fibers between the adjacent plies of the second composite fiber ply system cross to form an angle. This helps in preventing the strength weakness generated in the second composite fiber ply system, thereby enhancing the strength and stiffness of the system. As shown in FIGS. 15-17, fibers 1521 of the first non-spanwise fiber ply is just for illustration not for limitation. That is, the fibers oriented at an angle between ±15° and ±75° (for example, ±20°, ±30°, ±40°, ±45°, ±50°, ±60°, ±70°, or ±75°) relative to spanwise direction of the blade can be applied to any other non-spanwise fiber plies, for instance, second or third non-spanwise fiber ply.

Referring again to FIGS. 9-11, it can be seen that the first non-spanwise fiber ply 932 and the third spanwise fiber ply 935 end at the same spot or substantively end at a same spot. However, the first non-spanwise fiber ply 932 and the third spanwise fiber ply 935 are separated by the second spanwise fiber ply 933 and the second non-spanwise fiber ply 934 (two plies), which avoids two adjacent fiber plies ending at the same spot, thereby reducing the possibility of forming local strength weaknesses. However, it also works when at least one ply is disposed between two adjacent second composite fiber plies ending at the same spot or at substantively the same spot.

It is preferable that no more than two plies of a plurality of the second composite fiber plies end at a same spot or substantively end at a same spot. In at least one example embodiment, no more than two plies of a plurality of the second composite fiber plies end at a same spot or substantively end at a same spot both in chordwise direction and in spanwise direction. As shown in FIG. 11, when two plies substantively end at a same or substantially same spot, the length (for example, the chordwise length or the spanwise length) of two plies 932, 935 differs within ±100 mil (the difference D ranges from −100 mil to 100 mil). In another example embodiment, no more than two plies 932, 935 of a plurality of the second composite fiber plies ending at the substantively same spot differ (the difference D) within 20 times of an average thickness of one ply of the second composite fiber plies.

With reference to FIG. 9, including only a small amount of second composite fiber plies (i.e., glass plies) will not be enough to resist the high strain at the trailing edge of the blade. In at least one example embodiment, a chordwise length L1 of each of a plurality of the first composite fiber plies 840 accounts for 50% to 99% of the whole chordwise length of the blade, and a chordwise length L2 of each of a plurality of the second composite fiber plies 830 accounts for 1% to 50% of the whole chordwise length of the blade. "Chordwise length" used herein means the length size of second composite fiber ply or first composite fiber ply extending from leading edge to trailing edge.

An edge thickness of the blade is made up entirely of second composite fiber plies (i.e., glass fiber plies) accounting for 1% to 50% of the whole chordwise length of the blade. The blade thickness tapers in the manner of being thicker in the middle of the blade to being thinner on the edge of the blade. The number of second composite fiber plies used drives the amount of chordwise length where the part is entirely second composite fiber material, such as glass. More second composite fiber plies enable the trailing or leading edge of the blade to withstand higher strain during a bird impact since the reinforcement fiber material, such as glass, has higher strain to failure to provide an improved bird-strike capability.

In another example embodiment, the second composite fiber plies 830 wrap around trailing edge 829 (shown in FIG. 8) to cover the trailing edge 829. The second composite fiber plies 830 can have same or similar structure as shown in FIGS. 9-11.

Figure 18:
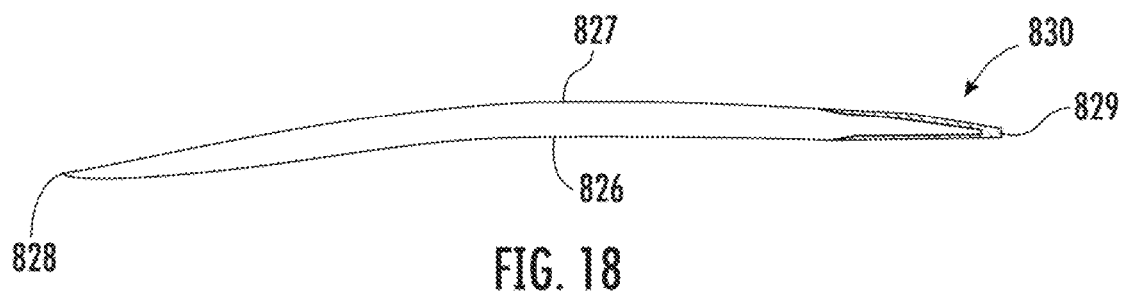
FIG. 18 is an illustrative cross-sectional view of blade in accordance with an exemplary embodiment of the present disclosure.
Figure 19:
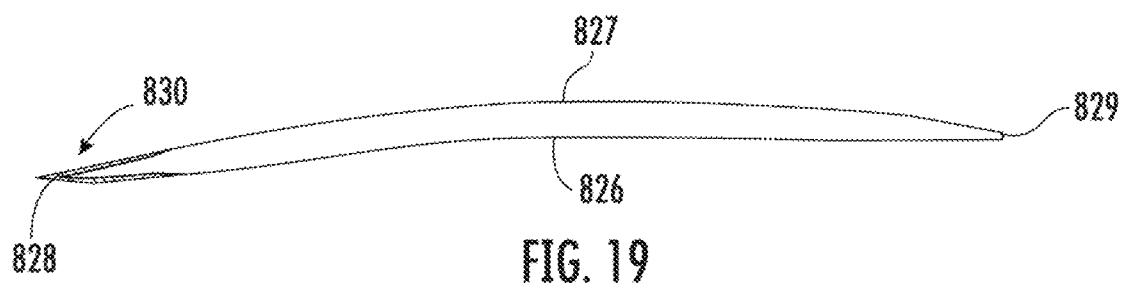
FIG. 19 is an illustrative cross-sectional view of blade in accordance with an exemplary embodiment of the present disclosure.
Figure 20:
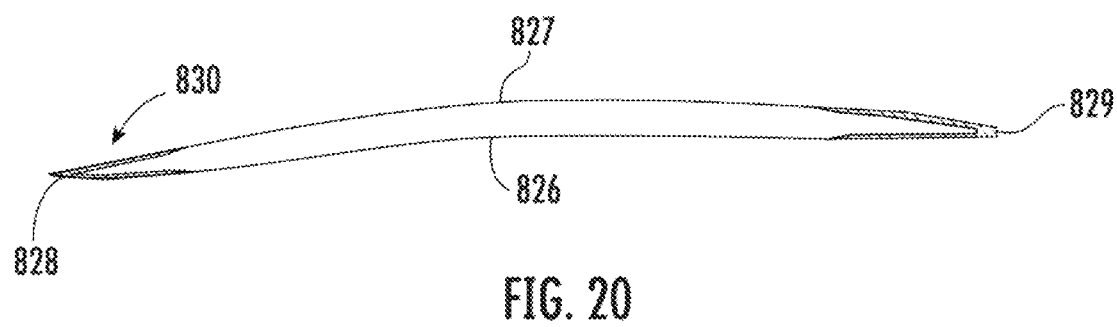
FIG. 20 is an illustrative cross-sectional view of blade in accordance with an exemplary embodiment of the present disclosure.

FIGS. 18-20 are illustrative cross-sectional views of a blade according to embodiments of the present disclosure. As shown in FIG. 18, the second composite fiber plies 830 are disposed at the trailing edge 829 of blade which wrap around the trailing edge. As shown in FIG. 19, the second composite fiber plies 830 are disposed at the leading edge 828 of blade which wrap around the leading edge. As shown in FIG. 20, the second composite fiber plies 830 are disposed at both the leading edge 828 and trailing edge 829 of blade which wrap around both two edges. According to the present disclosure, the second composite fiber plies (i.e., glass fiber) can be disposed at the leading edge, trailing edge, or both. But the stiffness of the blade will decrease if the reinforcement glass fiber plies are laid up more while composite carbon fiber layers are laid up less. So, it is not suggested to dispose the reinforcement glass fiber plies throughout the surfaces of the blade.

Figure 21:
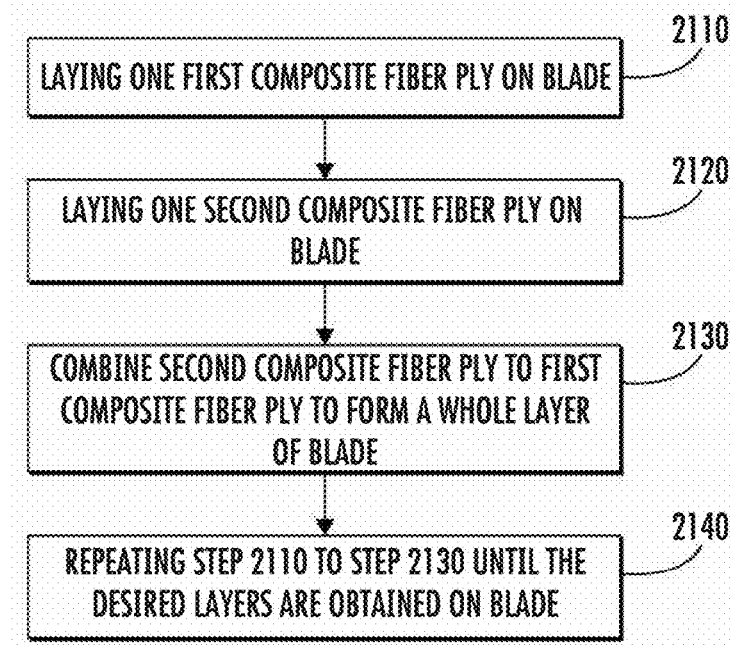
FIG. 21 is a flow chart showing the process of a method of making a blade of the present disclosure in accordance with an exemplary embodiment of the present disclosure.

FIG. 21 shows the process of a method of making a blade according to an embodiment of the present disclosure. In one whole layer of blade, the first composite fiber ply and the second composite fiber ply are two separate pieces that are combined together to form the one whole layer. As shown in FIG. 21, laying one first composite fiber ply on the blade at 2110, and then laying one second composite fiber ply on the blade at 2120 and combining it to the first composite fiber ply forms a whole layer of blade at 2130. Each whole layer of the blade, including the first composite fiber ply and the second composite fiber ply, is laid down before laying the next whole layer, and step 2110 to step 2130 is repeated until the desired layers are obtained on the blade 2140. During the process of combining second composite fiber plies to first composite fiber plies, ends of the second composite fiber plies are staggered (for example, staggered in both the chordwise direction and the spanwise direction of the blade) such that the interlock between the first composite fiber plies and the second composite fiber plies is formed at a region where the second composite fiber plies end and meet with the first composite fiber plies.

Figure 22:
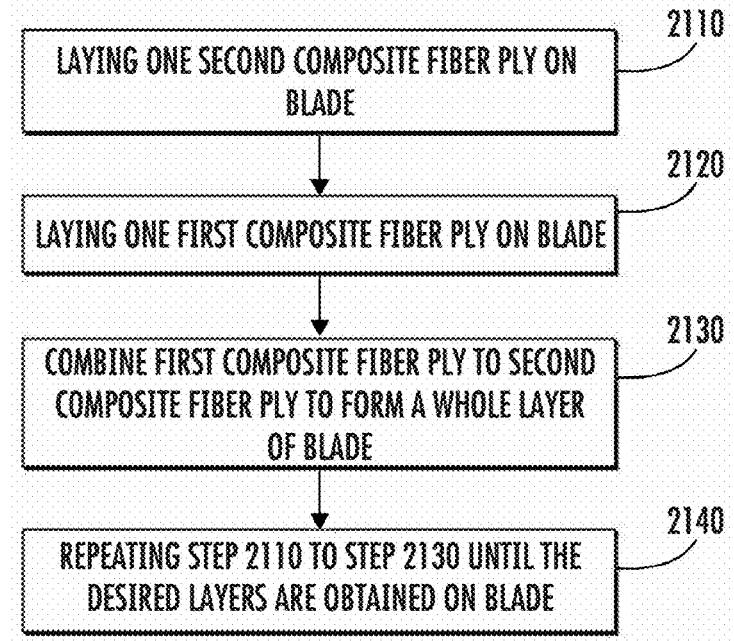
FIG. 22 is another flow chart showing the process of a method of making a blade of the present disclosure in accordance with an exemplary embodiment of the present disclosure.

FIG. 22 shows the process of a method of making a blade according to another embodiment of the present disclosure. Step 2110 and step 2120 shown in FIG. 21 may be reversed in a contrary sequence in FIG. 22. As depicted in FIG. 22, the method includes laying down one second composite fiber ply of the whole layer (i.e. glass fiber ply) on blade first at 2110, and laying down one first composite fiber ply of the whole layer (i.e. carbon fiber ply) after that at 2110, combining them to form a first whole layer of blade at 2130, and repeating the aforesaid steps to form a subsequent whole layer (i.e. a second whole layer) over the previous whole layer of blade (i.e. the first whole layer) until the anticipated number of whole layers is attained according to the actual requirements at 2140.

During the processes shown in FIGS. 21 and 22, the blade 820 may be constructed from one side of the blade toward the other side of the blade, or from two sides of the blade simultaneously. The first composite fiber plies and the second composite fiber plies are combined together via any conventional techniques known in the art such as autoclave cure, press cure, resin transfer molding (RTM), vacuum assisted resin transfer molding (VARTM) and so on. It could be understood that the expression of "combine," "combined," and/or "combination" used herein intends to mean first composite fiber plies and second composite fiber plies meet with each other rather than being physically joined together when they are laid down together on the blade.

The thickness of the first composite fiber plies and second composite fiber plies may vary depending on the actual requirements of the blade. The blade represented in the above-mentioned embodiments, as well as defined in the claims appended as follows, may be incorporated in an engine of an aircraft (i.e., GE9X from General Electric Company).

It should be understood that the second composite fiber plies according the present application could be applied to a turbine blade as well. That is, the second composite fiber plies are disposed at the leading edge and/or trailing edge of the turbine blade.

It is known in the art that the carbon composite fibers have high stiffness and high strength. Some blades use the carbon composite fibers designed in a way that run all the way to the trailing edge and/or the leading edge. However, the carbon composite fibers have lower strain to failure compared to glass fibers. Accordingly, to achieve a blade with high stiffness and strength, as well as bearing high strain when external load like a bird strike is applied on the blade, the present disclosure adopts reinforcement fiber materials such as glass fibers, and a reinforcement structure, such as the interlock generated transition area at the staggered ends of the second composite fiber plies in both the chordwise direction and the spanwise direction of the blade. The glass fibers have a higher strain to failure resulting in an improved bird strike capability compared to the carbon composite fibers. The chordwise length and the spanwise length of reinforcement spanwise glass plies monotonically tapers from the surface inwardly. The chordwise length and the spanwise length of reinforcement non-spanwise glass plies do not monotonically increase or monotonically decrease from the surface inwardly. This provides a smooth and robust transition from all carbon to carbon and glass and then to all glass. The blade of the present disclosure includes the following advantages of 1) having a higher strain to failure at the trailing edge and/or leading edge; 2) allowing the blade to be designed with a reduced thickness and larger chord; and 3) improving performance and efficiency of machines like an engine or aircraft incorporating such an engine.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 (0.7<SPF<4).

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the first stage of composite airfoils are fan blades.

The turbine engine of any proceeding clause, wherein the second stage of composite airfoils are outlet guide vanes.

The turbine engine of any proceeding clause, wherein the first airfoil extends spanwise between a first root and a first tip to define a first span length and wherein the second airfoil extends spanwise between a second root and a second tip to define a second span length.

The turbine engine of any proceeding clause, wherein the SPF is determined between 20% and 80% of the first span length and the second span length, inclusive of endpoints.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 (0.95<SPF<2.5).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL))/((CL)) to define an airfoil protection factor (APF); and wherein the APF is greater than or equal to 0.1 and less than or equal to 0.3 (0.1<APF<0.3).

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the first stage of composite airfoils has a first airfoil protection factor (APF1) and the second stage of composite airfoils has a second airfoil protection factor (APF2).

The turbine engine of any proceeding clause, wherein the first airfoil protection factor (APF1) relates to the second airfoil protection factor (APF2) by an expression: APF1/

APF2 to define a stage protection factor (SPF), wherein the SPF is greater than or equal to 0.7 and less than or equal to 4 (0.7<SPF<4).

The turbine engine of any proceeding clause, wherein the SPF is greater than or equal to 0.95 and less than or equal to 2.5 (0.95<SPF<2.5).

The turbine engine of any proceeding clause, wherein the set of composite airfoils extend spanwise between a root and a tip to define a span length and the APF is determined between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

An indirect drive turbine engine, comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 (0.7<SPF<4).

The indirect drive turbine engine of any proceeding clause, wherein the speed reduction device is a power gearbox.

The indirect drive turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any proceeding clause, further comprising a fan casing or nacelle.

The indirect drive turbine engine of any proceeding clause, wherein the fan drive turbine has between 3 and 5 stages.

The indirect drive turbine engine of any proceeding clause, wherein the speed reduction device is a power gearbox having a power gearbox reduction ratio between 2:1 and 5:1.

The indirect drive turbine engine of any proceeding clause, wherein a bypass ratio is between 10:1 and 22:1.

The indirect drive turbine engine of any proceeding clause, wherein a fan blade tip speed of the fan is less than 1400 feet per second.

The indirect drive turbine engine of any proceeding clause, wherein the core is an open rotor engine.

The indirect drive turbine engine of any proceeding clause, wherein the speed reduction device is a power gearbox having a power gearbox reduction ratio between 6:1 and 12:1.

The indirect drive turbine engine of any proceeding clause, wherein a bypass ratio is between 25:1 and 125:1.

The indirect drive turbine engine of any proceeding clause, wherein the first stage of composite airfoils and the second stage of composite airfoils include a polymer matrix composite (PMC).

The indirect drive turbine engine of any proceeding clause, wherein at least one of the first leading edge protector or the second leading edge protector is a metallic leading edge protector.

The indirect drive turbine engine of any proceeding clause, wherein the first stage of composite airfoils include the plurality of fan blades.

The indirect drive turbine engine of any proceeding clause, wherein the second stage of composite airfoils are outlet guide vanes or fan guide vanes.

The indirect drive turbine engine of any proceeding clause, wherein the first airfoil extends spanwise between a first root and a first tip to define a first span length and wherein the second airfoil extends spanwise between a second root and a second tip to define a second span length.

The indirect drive turbine engine of any proceeding clause, wherein the SPF is determined between 20% and 80% of the first span length and the second span length, inclusive of endpoints.

The indirect drive turbine engine of any proceeding clause, wherein the first stage of composite airfoils has a first number of airfoils and the second stage of composite airfoils has a second number of airfoils and the first number is different than the second number.

The indirect drive turbine engine of any proceeding clause, wherein the first stage of composite airfoils and the second stage of composite airfoils are configured to rotate.

The indirect drive turbine engine of any proceeding clause, wherein the SPF is greater than or equal to 0.95 and less than or equal to 2.5 (0.95<SPF<2.5).

The indirect drive turbine engine of any proceeding clause, wherein the first sheath and the second sheath each have a first wall, a second wall, and a third wall interconnecting the first wall and the second wall.

The indirect drive turbine engine of any proceeding clause, wherein the first wall, second wall, and third wall of the leading edge protector are oriented and shaped such that they define a U-shaped or C-shaped channel therebetween.

The indirect drive turbine engine of any proceeding clause, wherein the channel is sized and shaped to receive the composite leading edge of the composite portion.

The indirect drive turbine engine of any proceeding clause, wherein any of the first leading edge protector or the second leading edge protector are coupled to their corresponding composite portion at the corresponding composite leading edge to define at least one seam.

The indirect drive turbine engine of any proceeding clause wherein the at least one seam is two seams on either side of the airfoil, and the corresponding first leading length or second leading length is measured from the corresponding leading edge to the seam furthest from the leading edge.

The indirect drive turbine engine of any proceeding clause wherein the first leading length and the second leading length are measured from their corresponding leading edge to their corresponding seam.

The indirect drive turbine engine of any proceeding clause wherein an amount of overlap between the first sheath or the second sheath and their corresponding.

An indirect drive turbine engine comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL))/((CL)) to define an airfoil protection factor (APF); and wherein the APF is greater than or equal to 0.1 and less than or equal to 0.3 (0.1<APF<0.3).

The indirect drive turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any proceeding clause, further comprising a fan casing or nacelle.

The indirect drive turbine engine of any proceeding clause, wherein the fan drive turbine has between 3 and 5 stages.

The indirect drive turbine engine of any proceeding clause, wherein the speed reduction device is a power gearbox having a power gearbox reduction ratio between 2:1 and 5:1.

The indirect drive turbine engine of any proceeding clause, wherein a bypass ratio is between 10:1 and 22:1.

The indirect drive turbine engine of any proceeding clause, wherein a fan blade tip speed of the fan is less than 1400 feet per second.

The indirect drive turbine engine of any proceeding clause, wherein the core is an open rotor engine.

The indirect drive turbine engine of any proceeding clause, wherein the speed reduction device is a power gearbox having a power gearbox reduction ratio between 6:1 and 12:1.

The indirect drive turbine engine of any proceeding clause, wherein a bypass ratio is between 25:1 and 125:1.

The indirect drive turbine engine of any proceeding clause, wherein the set of composite airfoils includes a first stage of composite airfoils and a second stage of composite airfoils downstream from the first stage of composite airfoils.

The indirect drive turbine engine of any proceeding clause, wherein the first stage of composite airfoils is the plurality of fan blades and the second stage of composite airfoils is a set of outlet guide vanes or a set of fan guide vanes.

The indirect drive turbine engine of any proceeding clause, wherein the first stage of composite airfoils has a first airfoil protection factor (APF1) and the second stage of composite airfoils has a second airfoil protection factor (APF2).

The indirect drive turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 (0.7<SPF<4).

The indirect drive turbine engine of any proceeding clause, wherein the SPF is greater than or equal to 0.95 and less than or equal to 2.5 (0.95<SPF<2.5).

The indirect drive turbine engine of any proceeding clause, wherein the set of composite airfoils extend spanwise between a root and a tip to define a span length and the APF is determined between 20% and 80% of the first span length and the second span length.

The indirect drive turbine engine of any proceeding clause, wherein the leading edge protector overlaps with the composite leading edge to define a sheath.

The indirect drive turbine engine of any proceeding clause, wherein the composite portion is formed from a polymer matrix composite (PMC).

The indirect drive turbine engine of any proceeding clause, wherein the leading edge protector is a metallic leading edge protector.

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector receiving at least a portion of the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector receiving at least a portion of the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 (0.7<SPF<4).

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the composite airfoils of the first stage of composite airfoils are fan blades.

The turbine engine of any proceeding clause, wherein the composite airfoils of the second stage of composite airfoils are outlet guide vanes.

The turbine engine of any proceeding clause, wherein the first airfoil extends spanwise from a first root to a first tip to define a first span length and wherein the second airfoil extends spanwise from a second root to a second tip to define a second span length, wherein the SPF is determined between 20% and 80% of the first span length and the second span length, inclusive of endpoints.

The turbine engine of any proceeding clause, wherein the first leading edge protector and the second leading edge protector each comprise a sheath.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 (0.95<SPF<2.5).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: (LL)/(CL) to define an airfoil protection factor (APF); and wherein the APF is greater than or equal to 0.1 and less than or equal to 0.3 (0.1<APF<0.3).

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the composite airfoils in the first stage of composite airfoils have a first airfoil protection factor (APF1) and the second stage of composite airfoils have a second airfoil protection factor (APF2).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 (0.7<SPF<4).

The turbine engine of any proceeding clause, wherein the SPF is greater than or equal to 0.95 and less than or equal to 2.5 (0.95<SPF<2.5).

The turbine engine of any proceeding clause, wherein the composite airfoils in the set of composite airfoils extend spanwise between a root and a tip to define a span length and the APF is determined between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

A blade comprising: a plurality of first composite fiber plies; and a plurality of second composite fiber plies;

wherein ends of the second fiber plies are staggered such that interlock between the first composite fiber plies and the second composite fiber plies is formed in a region where the second composite fiber plies end and meet with the first composite fiber plies.

The blade of any preceding clause, wherein the second composite fiber plies comprise unidirectional fibers.

The blade of any preceding clause, wherein a plurality of the second composite fiber plies comprising: spanwise fiber plies decrease both in chordwise length and in spanwise length monotonically from surface of the blade inwardly.

The blade of any preceding clause, wherein a plurality of the second composite fiber plies comprising: non-spanwise fiber plies do not monotonically decrease or increase from surface of the blade inwardly.

The blade of any preceding clause, wherein a plurality of the second composite fiber plies comprising spanwise fiber plies and non-spanwise fiber plies, wherein the non-spanwise fiber plies are disposed between adjacent spanwise fiber plies such that the adjacent spanwise fiber plies are spaced by the non-spanwise fiber plies.

The blade of any preceding clause, wherein the non-spanwise fiber plies have fibers oriented at an angle between 15° and 75° and/or have fibers oriented at an angle between −75° and −15° relative to a spanwise direction of the blade.

The blade of any preceding clause, wherein the non-spanwise fiber plies have fibers oriented at the angle of 45° and/or have fibers oriented at an angle of −45° relative to the spanwise direction of the blade.

The blade of any preceding clause, wherein no more than two plies of a plurality of the second composite fiber plies end at a same spot or at a substantively same spot.

The blade of any preceding clause, wherein no more than two plies of a plurality of the second composite fiber plies ending at the substantively same spot differ within 100 mil.

The blade of any preceding clause, wherein no more than two plies of a plurality of the second composite fiber plies ending at the substantively same spot differ within 20 times of an average thickness of one ply of the second composite fiber plies.

The blade of any preceding clause, wherein at least one ply is disposed between the adjacent second composite fiber plies ending at the same spot or at the substantively same spot.

The blade of any preceding clause, wherein chordwise length of each of a plurality of the first composite fiber plies accounts for 50% to 99% of whole chordwise length of the blade and chordwise length of each of a plurality of the second composite fiber plies accounts for 1% to 50% of the whole chordwise length of the blade.

The blade of any preceding clause, wherein a plurality of the first composite fiber plies do not extend to an end of a leading edge and/or an end of a trailing edge of the blade.

The blade of any preceding clause, wherein edge thickness of the blade is made up of entirely second composite fiber plies accounting for 1% to 50% of the whole chordwise length of the blade.

The blade of any preceding clause, wherein the second composite fiber plies are disposed on a trailing edge and/or a leading edge of the blade.

The blade of any preceding clause, the second composite fiber plies extend around a trailing edge and/or a leading edge from a first surface of blade to a second surface of blade.

The blade of any preceding clause, wherein fibers of a plurality of the first composite fiber plies are selected from carbon fibers.

The blade of any preceding clause, wherein fibers of a plurality of the second composite fiber plies are selected from glass, aramid, polymer, and basalt fibers.

An engine of an aircraft comprising a blade of any preceding clause.

A method of making a blade comprising: laying a plurality of first composite fiber plies on the blade; and laying a plurality of second composite fiber plies in combination with the plurality of the first composite fiber plies to make ends of the second composite fiber plies be staggered such that interlock between the first composite fiber plies and the second composite fiber plies is formed in a region where the second composite fiber plies end and meet with the first composite fiber plies.

A turbine engine, comprising: a fan; a turbomachine defining an engine centerline and comprising a compressor section, a combustion section, and a turbine section in serial flow order; the fan comprising a first stage of composite airfoils circumferentially arranged about the engine centerline, a first airfoil of the first stage of composite airfoils comprising: a first composite portion extending chordwise between a first composite leading edge and a first trailing edge, the first composite portion including a plurality of first composite fiber plies and a plurality of second composite fiber plies, herein ends of the second fiber plies are staggered such that interlock between the first composite fiber plies and the second composite fiber plies is formed in a region where the second composite fiber plies end and meet with the first composite fiber plies; a first leading edge protector receiving at least a portion of the first composite leading edge of the first composite portion, the first leading edge protector extending chordwise from a first leading edge towards the first composite portion for a first leading length (FLL); and the first composite portion and the first leading edge protector together defining an exterior surface of the first airfoil and extending chordwise between the first leading edge and the first trailing edge to define a first chord length (FCL); a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge; a second leading edge protector receiving at least a portion of the second composite leading edge of the second composite portion, the second leading edge protector extending chordwise from a second leading edge towards the second composite portion for a second leading length (SLL); and the second composite portion and the second leading edge protector together defining an exterior surface of the second airfoil and extending chordwise between the second leading edge and the second trailing edge to define a second chord length (SCL); wherein the first leading length (FLL) and the first chord length (FCL) are related to the second leading length (SLL) and the second chord length (SCL) by a stage protection factor (SPF), wherein SPF= ((FLL/FCL))/((SLL/SCL)) and SPF is greater than or equal to 0.7 and less than or equal to 4 (0.7<SPF<4).

The turbine engine of any preceding clause, wherein the second composite fiber plies comprise unidirectional fibers.

The turbine engine of any preceding clause, wherein a plurality of the second composite fiber plies comprising: spanwise fiber plies that decrease both in chordwise length and in spanwise length monotonically from surface of the blade inwardly.

The turbine engine of any preceding clause, wherein a plurality of the second composite fiber plies comprising:

non-spanwise fiber plies do not monotonically decrease or increase from surface of the blade inwardly.

The turbine engine of any preceding clause, wherein the second composite fiber plies comprise a plurality of spanwise fiber plies that decrease in both a chordwise length and a spanwise length monotonically from a surface of the first airfoil inwardly, and the second composite fiber plies further comprise a plurality of non-spanwise fiber plies that do not monotonically decrease or increase in either a chordwise length or a spanwise length from the surface of the first airfoil inwardly The turbine engine of any preceding clause, wherein a plurality of the second composite fiber plies comprising spanwise fiber plies and non-spanwise fiber plies, wherein the non-spanwise fiber plies are disposed between adjacent spanwise fiber plies such that the adjacent spanwise fiber plies are spaced by the non-spanwise fiber plies.

The turbine engine of any preceding clause, wherein the non-spanwise fiber plies have fibers oriented at an angle between 15° and 75° and/or have fibers oriented at an angle between −75° and −15° relative to a spanwise direction of the blade.

The turbine engine of any preceding clause, wherein the non-spanwise fiber plies have fibers oriented at the angle of 45° and/or have fibers oriented at an angle of −45° relative to the spanwise direction of the blade.

The turbine engine of any preceding clause, wherein no more than two plies of a plurality of the second composite fiber plies end at a same spot or at a substantively same spot.

The turbine engine of any preceding clause, wherein no more than two plies of a plurality of the second composite fiber plies ending at the substantively same spot differ within 100 mil.

The turbine engine of any preceding clause, wherein no more than two plies of a plurality of the second composite fiber plies ending at the substantively same spot differ within 20 times of an average thickness of one ply of the second composite fiber plies.

The turbine engine of any preceding clause, wherein at least one ply is disposed between the adjacent second composite fiber plies ending at the same spot or at the substantively same spot.

The turbine engine of any preceding clause, wherein chordwise length of each of a plurality of the first composite fiber plies accounts for 50% to 99% of whole chordwise length of the blade and chordwise length of each of a plurality of the second composite fiber plies accounts for 1% to 50% of the whole chordwise length of the blade.

The turbine engine of any preceding clause, wherein a plurality of the first composite fiber plies do not extend to an end of a leading edge and/or an end of a trailing edge of the blade.

The turbine engine of any preceding clause, wherein edge thickness of the blade is made up of entirely second composite fiber plies accounting for 1% to 50% of the whole chordwise length of the blade.

The turbine engine of any preceding clause, wherein the second composite fiber plies are disposed on a trailing edge and/or a leading edge of the blade.

The turbine engine of any preceding clause, the second composite fiber plies extend around a trailing edge and/or a leading edge from a first surface of blade to a second surface of blade.

The turbine engine of any preceding clause, wherein fibers of a plurality of the first composite fiber plies are selected from carbon fibers.

The turbine engine of any preceding clause, wherein fibers of a plurality of the second composite fiber plies are selected from glass, aramid, polymer, and basalt fibers.

The turbine engine of any preceding clause, wherein the first stage of composite airfoils and the second stage of composite airfoils include a polymer matrix composite (PMC).

The turbine engine of any preceding clause, wherein at least one of the first leading edge protector or the second leading edge protector is a metallic leading edge protector.

The turbine engine of any preceding clause, wherein the composite airfoils of the first stage of composite airfoils are fan blades.

The turbine engine of any preceding clause, wherein the composite airfoils of the second stage of composite airfoils are outlet guide vanes.

The turbine engine of any preceding clause, wherein the first airfoil extends spanwise between a first root and a first tip to define a first span length and wherein the second airfoil extends spanwise between a second root and a second tip to define a second span length and wherein the SPF is between 20% and 80% of the first span length and the second span length, inclusive of endpoints.

The turbine engine of any preceding clause, wherein the first leading edge protector and the second leading edge protector each comprise a sheath.

The turbine engine of any preceding clause, wherein the first stage of composite airfoils has a first number of airfoils and the second stage of composite airfoils has a second number of airfoils and the first number is different than the second number.

The turbine engine of any preceding clause, wherein the first stage of composite airfoils and the second stage of composite airfoils are configured to rotate.

The turbine engine of any preceding clause, wherein the SPF is greater than or equal to 0.95 and less than or equal to 2.5 ($0.95 < SPF < 2.5$).

The turbine engine of any preceding clause, further comprising a speed reduction device driven by the turbine section for rotating the fan about the engine centerline.

The turbine engine of any preceding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The turbine engine of any preceding clause, wherein at least one of a bypass ratio is between 10:1 and 22:1, a fan blade tip speed of the fan is less than 1400 feet per second, or the speed reduction device is a power gearbox having a power gearbox reduction ratio between 2:1 and 5:1.

The turbine engine of any preceding clause, wherein: the core is an open rotor engine; and at least one of a bypass ratio is between 25:1 and 125:1 or the speed reduction device is a power gearbox having a power gearbox reduction ratio between 6:1 and 12:1.

A turbine engine comprising: a fan; a turbomachine defining an engine centerline and comprising a compressor section, a combustion section, and a turbine section in serial flow order; and the fan comprising a set of composite airfoils circumferentially arranged about the engine centerline, an airfoil of the set of composite airfoils comprising: a composite portion extending chordwise between a composite leading edge and a trailing edge, the composite portion including a plurality of first composite fiber plies and a plurality of second composite fiber plies, herein ends of the second fiber plies are staggered such that interlock between the first composite fiber plies and the second composite fiber plies is formed in a region where the second composite fiber plies end and meet with the first composite fiber plies; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) is related to the chord length (CL) by an airfoil protection factor (APF)=((LL))/((CL)) and APF is greater than or equal to 0.1 and less than or equal to 0.3 (0.1<APF<0.3).

The turbine engine of any preceding clause, wherein the second composite fiber plies comprise unidirectional fibers.

The turbine engine of any preceding clause, wherein a plurality of the second composite fiber plies comprising: spanwise fiber plies decrease both in chordwise length and in spanwise length monotonically from surface of the blade inwardly.

The turbine engine of any preceding clause, wherein a plurality of the second composite fiber plies comprising: non-spanwise fiber plies do not monotonically decrease or increase from surface of the blade inwardly.

The turbine engine of any preceding clause, wherein the second composite fiber plies comprise a plurality of spanwise fiber plies that decrease in both a chordwise length and a spanwise length monotonically from a surface of the airfoil inwardly, and the second composite fiber plies further comprise a plurality of non-spanwise fiber plies that do not monotonically decrease or increase in either a chordwise length or a spanwise length from the surface of the airfoil inwardly.

The turbine engine of any preceding clause, wherein a plurality of the second composite fiber plies comprising spanwise fiber plies and non-spanwise fiber plies, wherein the non-spanwise fiber plies are disposed between adjacent spanwise fiber plies such that the adjacent spanwise fiber plies are spaced by the non-spanwise fiber plies.

The turbine engine of any preceding clause, wherein the non-spanwise fiber plies have fibers oriented at an angle between 15° and 75° and/or have fibers oriented at an angle between −75° and −15° relative to a spanwise direction of the blade.

The turbine engine of any preceding clause, wherein the non-spanwise fiber plies have fibers oriented at the angle of 45° and/or have fibers oriented at an angle of −45° relative to the spanwise direction of the blade.

The turbine engine of any preceding clause, wherein no more than two plies of a plurality of the second composite fiber plies end at a same spot or at a substantively same spot.

The turbine engine of any preceding clause, wherein no more than two plies of a plurality of the second composite fiber plies ending at the substantively same spot differ within 100 mil.

The turbine engine of any preceding clause, wherein no more than two plies of a plurality of the second composite fiber plies ending at the substantively same spot differ within 20 times of an average thickness of one ply of the second composite fiber plies.

The turbine engine of any preceding clause, wherein at least one ply is disposed between the adjacent second composite fiber plies ending at the same spot or at the substantively same spot.

The turbine engine of any preceding clause, wherein chordwise length of each of a plurality of the first composite fiber plies accounts for 50% to 99% of whole chordwise length of the blade and chordwise length of each of a plurality of the second composite fiber plies accounts for 1% to 50% of the whole chordwise length of the blade.

The turbine engine of any preceding clause, wherein a plurality of the first composite fiber plies do not extend to an end of a leading edge and/or an end of a trailing edge of the blade.

The turbine engine of any preceding clause, wherein edge thickness of the blade is made up of entirely second composite fiber plies accounting for 1% to 50% of the whole chordwise length of the blade.

The turbine engine of any preceding clause, wherein the second composite fiber plies are disposed on a trailing edge and/or a leading edge of the blade.

The turbine engine of any preceding clause, the second composite fiber plies extend around a trailing edge and/or a leading edge from a first surface of blade to a second surface of blade.

The turbine engine of any preceding clause, wherein fibers of a plurality of the first composite fiber plies are selected from carbon fibers.

The turbine engine of any preceding clause, wherein fibers of a plurality of the second composite fiber plies are selected from glass, aramid, polymer, and basalt fibers.

The turbine engine of any preceding clause, wherein the set of composite airfoils includes a first stage of composite airfoils and a second stage of composite airfoils downstream from the first stage of composite airfoils.

The turbine engine of any preceding clause, wherein the first stage of composite airfoils is a set of fan blades and the second stage of composite airfoils is a set of outlet guide vanes.

The turbine engine of any preceding clause, wherein the composite airfoils in the first stage of composite airfoils have a first airfoil protection factor (APF1) and the composite airfoils in the second stage of composite airfoils have a second airfoil protection factor (APF2).

The turbine engine of any preceding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 (0.7<SPF<4).

The turbine engine of any preceding clause, wherein the SPF is greater than or equal to 0.95 and less than or equal to 2.5 (0.95<SPF<2.5).

The turbine engine of any preceding clause, wherein the composite airfoils in the set of composite airfoils extend spanwise between a root and a tip to define a span length and the APF is determined between 20% and 80% of the span length.

The turbine engine of any preceding clause, wherein the leading edge protector overlaps with the composite leading edge to define a sheath.

The turbine engine of any preceding clause, wherein the composite portion is formed from a polymer matrix composite (PMC).

The turbine engine of any preceding clause, wherein the leading edge protector is a metallic leading edge protector.

The turbine engine of any preceding clause, further comprising a speed reduction device driven by the turbine section for rotating the fan about the engine centerline.

The turbine engine of any preceding clause, wherein turbine section includes a fan drive turbine and a second turbine and the second turbine is disposed forward of the fan drive turbine and the fan drive turbine includes a plurality of fan drive turbine stages with the speed reduction device driven by the fan drive turbine.

The turbine engine of any preceding clause, wherein at least one of a bypass ratio is between 10:1 and 22:1, a fan blade tip speed of the fan is less than 1400 feet per second, or the speed reduction device is a power gearbox having a power gearbox reduction ratio between 2:1 and 5:1.

The turbine engine of any preceding clause, wherein: the core is an open rotor engine; and at least one of a bypass ratio is between 25:1 and 125:1 or the speed reduction device is a power gearbox having a power gearbox reduction ratio between 6:1 and 12:1.

What is claimed is:

1. A turbine engine, comprising:
a fan;
a turbomachine defining an engine centerline and comprising a compressor section, a combustion section, and a turbine section in serial flow order;
the fan comprising a first stage of composite airfoils circumferentially arranged about the engine centerline, a first airfoil of the first stage of composite airfoils comprising:
a first composite portion extending chordwise between a first composite leading edge and a first trailing edge, the first composite portion including first composite fiber plies and second composite fiber plies, wherein ends of the second composite fiber plies are staggered such that an interlock between the first composite fiber plies and the second composite fiber plies is formed in a region where the ends of the second composite fiber plies meet the first composite fiber plies;
a first leading edge protector receiving at least a portion of the first composite leading edge of the first composite portion, the first leading edge protector extending chordwise from a first leading edge towards the first composite portion for a first leading length (FLL); and
the first composite portion and the first leading edge protector together defining an exterior surface of the first airfoil and extending chordwise between the first leading edge and the first trailing edge to define a first chord length (FCL);
a second stage of composite airfoils located downstream of the first stage of composite airfoils and circumferentially arranged about the engine centerline, a second airfoil of the second stage of composite airfoils comprising:
a second composite portion extending chordwise between a second composite leading edge and a second trailing edge;
a second leading edge protector receiving at least a portion of the second composite leading edge of the second composite portion, the second leading edge protector extending chordwise from a second leading edge towards the second composite portion for a second leading length (SLL); and
the second composite portion and the second leading edge protector together defining an exterior surface of the second airfoil and extending chordwise between the second leading edge and the second trailing edge to define a second chord length (SCL);
wherein the FLL and the FCL are related to the SLL and the SCL by a stage protection factor (SPF),
wherein the $$SPF = \frac{(FLL/FCL)}{(SLL/SCL)},$$

and the SPF is greater than or equal to 0.7 and less than or equal to 4 (0.7≤SPF≤4).

2. The turbine engine of claim 1, wherein the second composite fiber plies comprise unidirectional fibers.

3. The turbine engine of claim 1, wherein the second composite fiber plies comprise a plurality of spanwise fiber plies that decrease in both a chordwise length and a spanwise length monotonically from a surface of the first airfoil inwardly, and the second composite fiber plies further comprise a plurality of non-spanwise fiber plies that do not monotonically decrease or increase in either a chordwise length or a spanwise length from the surface of the first airfoil inwardly.

4. The turbine engine of claim 1, wherein:
a plurality of the second composite fiber plies comprise spanwise fiber plies and non-spanwise fiber plies;
the non-spanwise fiber plies are disposed between adjacent spanwise fiber plies such that the adjacent spanwise fiber plies are spaced by the non-spanwise fiber plies; and
the non-spanwise fiber plies have fibers oriented at an angle between 15° and 75° relative to a spanwise direction of the first airfoil, have fibers oriented at an angle between −75° and −15° relative to the spanwise direction of the first airfoil, or both.

5. The turbine engine of claim 1, wherein a chordwise length of each of a plurality of the first composite fiber plies accounts for 50% to 99% of a whole chordwise length of the first airfoil, and a chordwise length of each of a plurality of the second composite fiber plies accounts for 1% to 50% of the whole chordwise length of the first airfoil.

6. The turbine engine of claim 1, wherein the second composite fiber plies are disposed on the first trailing edge, the first leading edge, or both the first trailing edge and the first leading edge.

7. The turbine engine of claim 1, wherein:
fibers of a plurality of the first composite fiber plies are carbon fibers; and
fibers of a plurality of the second composite fiber plies are selected from glass, aramid, polymer, and basalt fibers.

8. The turbine engine of claim 1, wherein the first airfoil extends spanwise between a first root and a first tip to define a first span length, the second airfoil extends spanwise between a second root and a second tip to define a second span length, and the SPF is between 20% and 80% of the first span length and the second span length, inclusive of endpoints.

9. The turbine engine of claim 1, wherein the SPF is greater than or equal to 0.95 and less than or equal to 2.5 (0.95≤SPF<2.5).

10. The turbine engine of claim 1, further comprising:
a speed reduction device driven by the turbine section for rotating the fan about the engine centerline;
wherein the turbine section includes a fan drive turbine and a second turbine, the second turbine is disposed forward of the fan drive turbine, and the fan drive turbine includes a plurality of fan drive turbine stages with the speed reduction device driven by the fan drive turbine;
wherein at least one of a bypass ratio is between 10:1 and 22:1, a fan blade tip speed of the fan is less than 1400 feet per second, or the speed reduction device is a power gearbox having a power gearbox reduction ratio between 2:1 and 5:1; and wherein the turbine engine is an open rotor engine.

11. A turbine engine comprising:

a fan;

a turbomachine defining an engine centerline and comprising a compressor section, a combustion section, and a turbine section in serial flow order; and the fan comprising a set of composite airfoils circumferentially arranged about the engine centerline, an airfoil of the set of composite airfoils comprising:
- a composite portion extending chordwise between a composite leading edge and a trailing edge, the composite portion including first composite fiber plies and second composite fiber plies, wherein ends of the second composite fiber plies are staggered such that an interlock between the first composite fiber plies and the second composite fiber plies is formed in a region where the ends of the second composite fiber plies meet with the first composite fiber plies;
- a leading edge protector coupled to the composite portion at the composite leading edge to define a seam, and extending chordwise between a leading edge and the seam to define a leading length (LL); and
- the composite portion and the leading edge protector together defining an exterior surface of the airfoil and extending chordwise between the leading edge and the trailing edge to define a chord length (CL);

wherein the LL is related to the CL by an airfoil protection factor $$(APF) = \frac{(LL)}{(CL)},$$

and the APF is greater than or equal to 0.1 and less than or equal to 0.3 (0.1≤APF≤0.3).

12. The turbine engine of claim 11, wherein the second composite fiber plies comprise unidirectional fibers.

13. The turbine engine of claim 11, wherein the second composite fiber plies comprise a plurality of spanwise fiber plies that decrease in both a chordwise length and a spanwise length monotonically from a surface of the airfoil inwardly, and the second composite fiber plies further comprise a plurality of non-spanwise fiber plies that do not monotonically decrease or increase in either a chordwise length or a spanwise length from the surface of the airfoil inwardly.

14. The turbine engine of claim 11, wherein:
- a plurality of the second composite fiber plies comprise spanwise fiber plies and non-spanwise fiber plies, wherein the non-spanwise fiber plies are disposed between adjacent spanwise fiber plies such that the adjacent spanwise fiber plies are spaced by the non-spanwise fiber plies; and
- the non-spanwise fiber plies have fibers oriented at an angle between 15° and 75° relative to a spanwise direction of the airfoil, and the non-spanwise fiber plies have fibers oriented at an angle between −75° and −15° relative to a spanwise direction of the airfoil, or both.

15. The turbine engine of claim 11, wherein a chordwise length of each of a plurality of the first composite fiber plies accounts for 50% to 99% of a whole chordwise length of the airfoil, and a chordwise length of each of a plurality of the second composite fiber plies accounts for 1% to 50% of the whole chordwise length of the airfoil.

16. The turbine engine of claim 11, wherein the second composite fiber plies are disposed on the trailing edge, the leading edge, or both the trailing edge and the leading edge.

17. The turbine engine of claim 11, wherein:
- fibers of a plurality of the first composite fiber plies are carbon fibers; and
- fibers of a plurality of the second composite fiber plies are selected from glass, aramid, polymer, and basalt fibers.

18. The turbine engine of claim 11, wherein:
- the composite airfoils include a first stage of composite airfoils and a second stage of composite airfoils;
- the first stage of composite airfoils is a set of fan blades and the second stage of composite airfoils is a set of outlet guide vanes;
- the composite airfoils in the first stage of composite airfoils have a first airfoil protection factor (APF1), and the composite airfoils in the second stage of composite airfoils have a second airfoil protection factor (APF2); and
- the APF1 relates to the APF2 by an expression:

$$\frac{APF1}{APF2}$$

to define a stage protection factor (SPF), wherein the SPF is greater than or equal to 0.7 and less than or equal to 4 (0.7≤SPF≤4).

19. The turbine engine of claim 11, wherein the composite airfoils in the set of composite airfoils extend spanwise between a root and a tip to define a span length and the APF is determined between 20% and 80% of the span length.

20. The turbine engine of claim 11, further comprising:
- a speed reduction device driven by the turbine section for rotating the fan about the engine centerline;
- wherein the turbine section includes a fan drive turbine and a second turbine, the second turbine is disposed forward of the fan drive turbine, and the fan drive turbine includes a plurality of fan drive turbine stages with the speed reduction device driven by the fan drive turbine;
- wherein at least one of a bypass ratio is between 10:1 and 22:1, a fan blade tip speed of the fan is less than 1400 feet per second, or the speed reduction device is a power gearbox having a power gearbox reduction ratio between 2:1 and 5:1; and
- wherein the turbine engine is an open rotor engine.

* * * * *